Oct. 25, 1966    J. B. BRADICICH ETAL    3,280,706
BOX CRIMPING AND TAKEOUT SYSTEM
Filed June 21, 1963    10 Sheets-Sheet 1

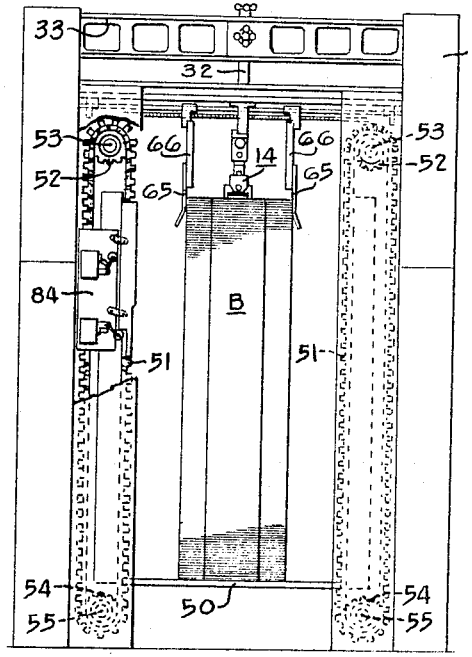
FIG 2
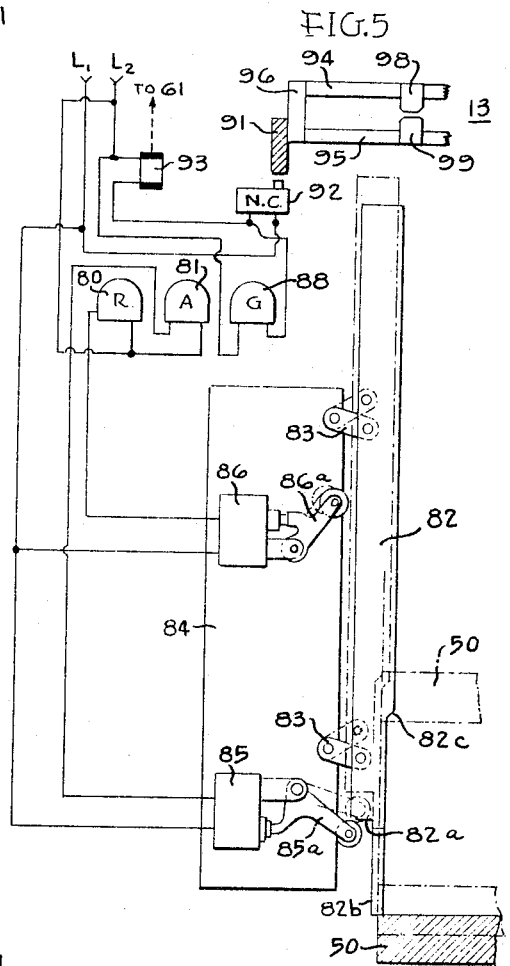
FIG.5
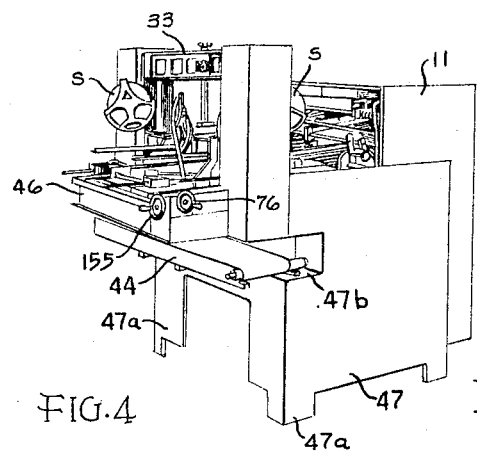
FIG.4
FIG.5a
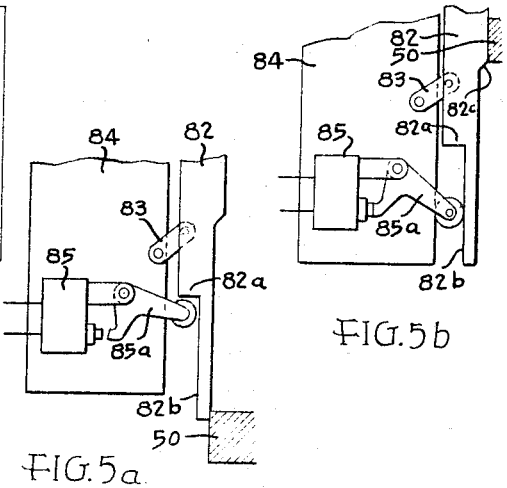
FIG.5b

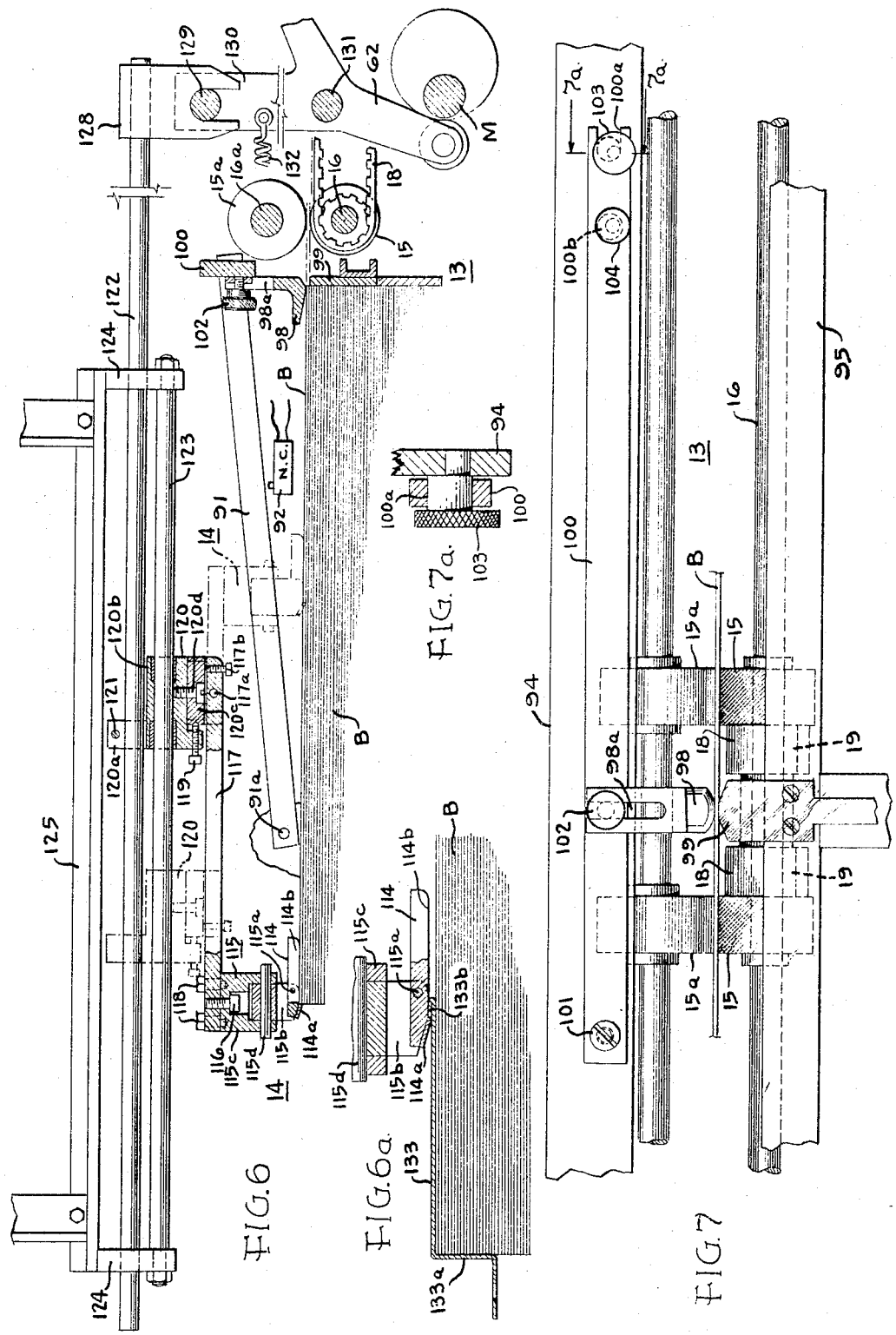

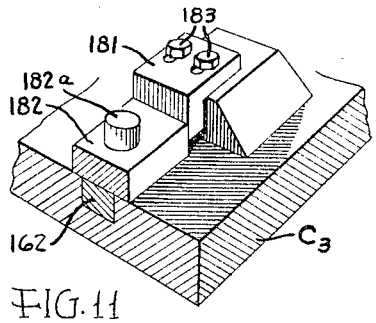
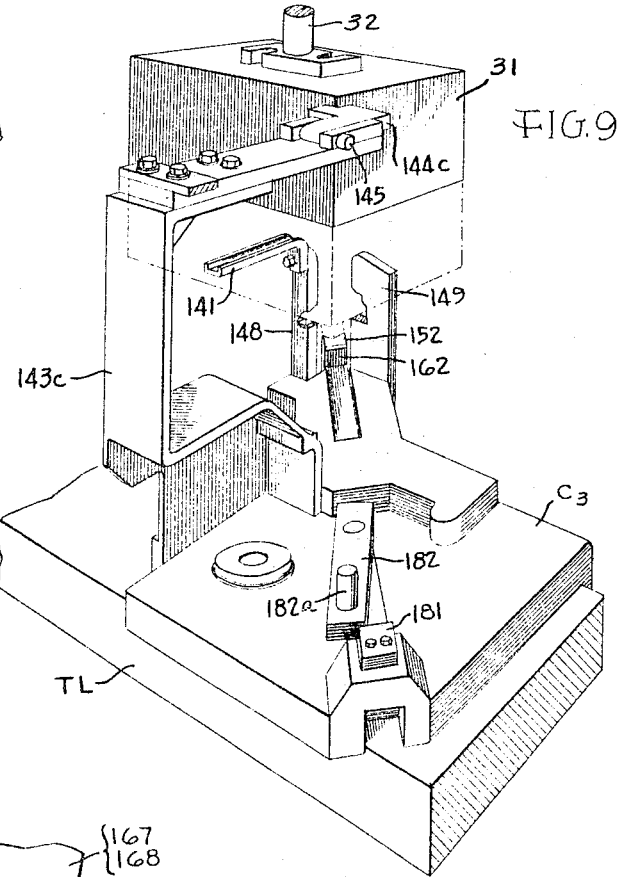
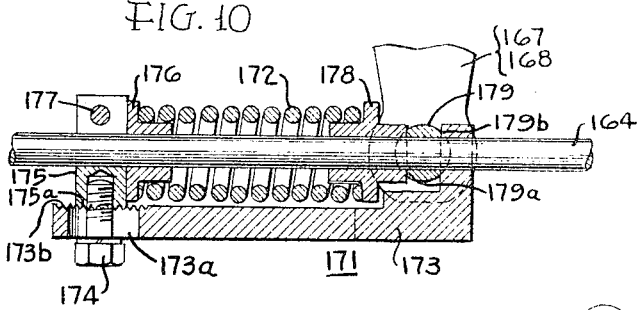
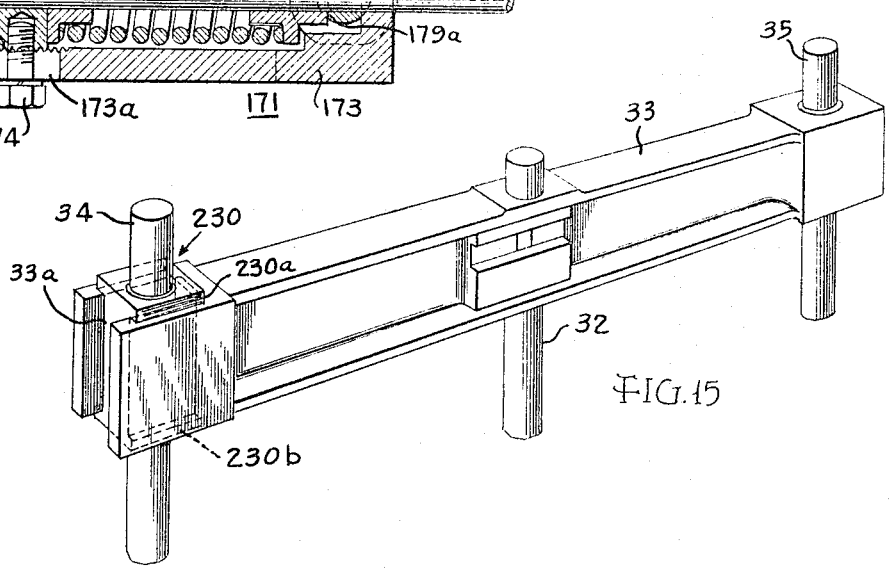

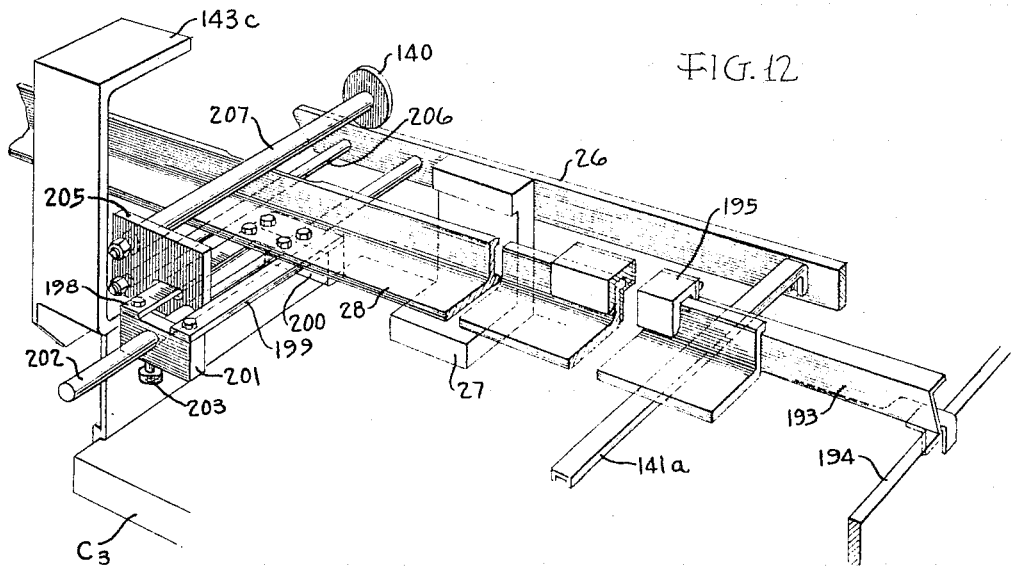
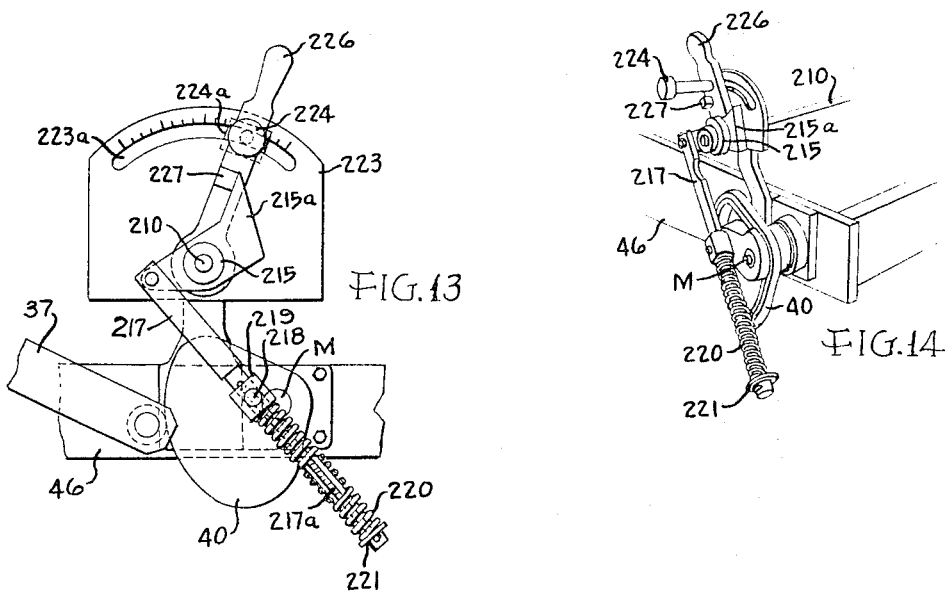

Oct. 25, 1966 J. B. BRADICICH ETAL 3,280,706
BOX CRIMPING AND TAKEOUT SYSTEM
Filed June 21, 1963 10 Sheets-Sheet 8

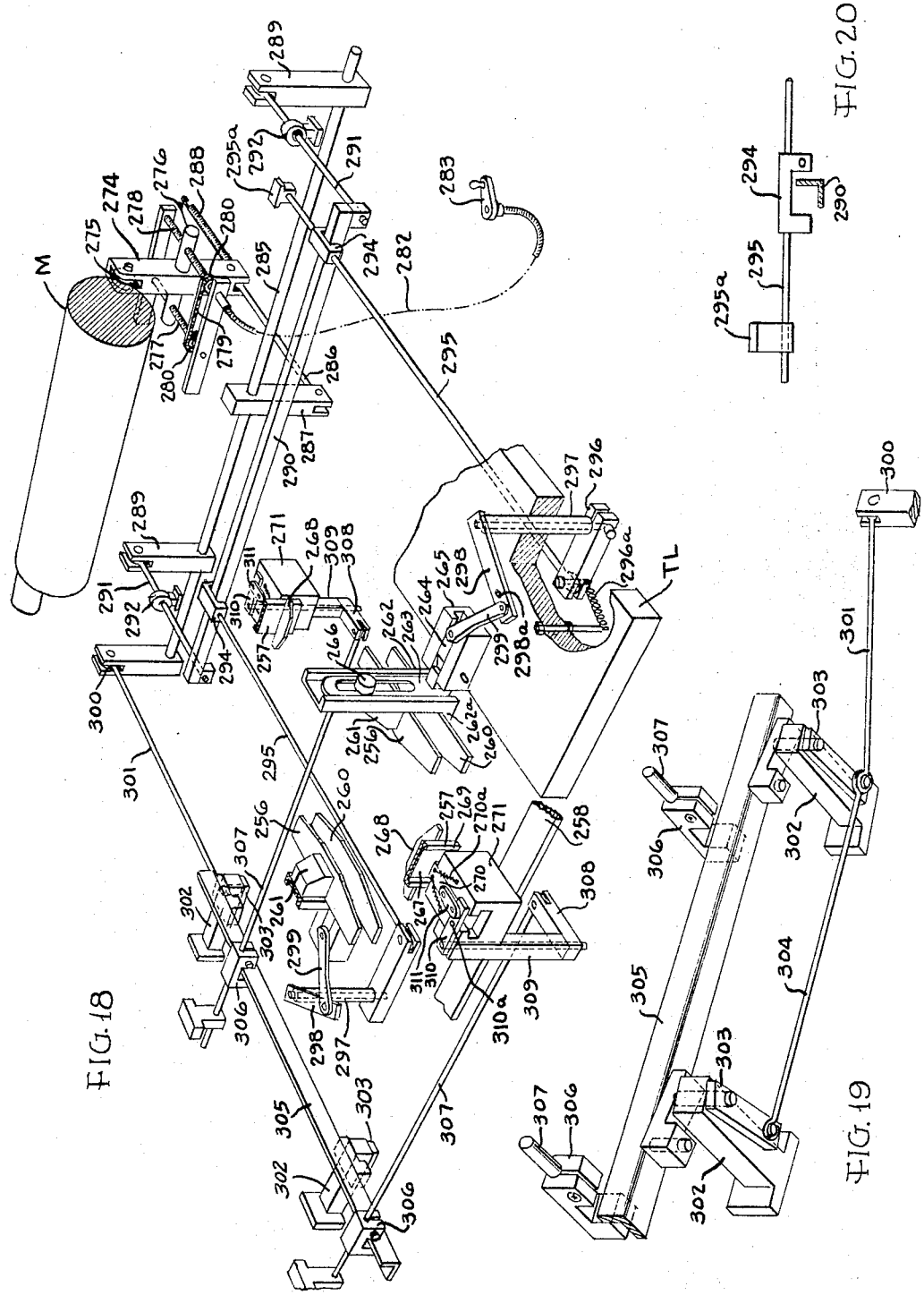

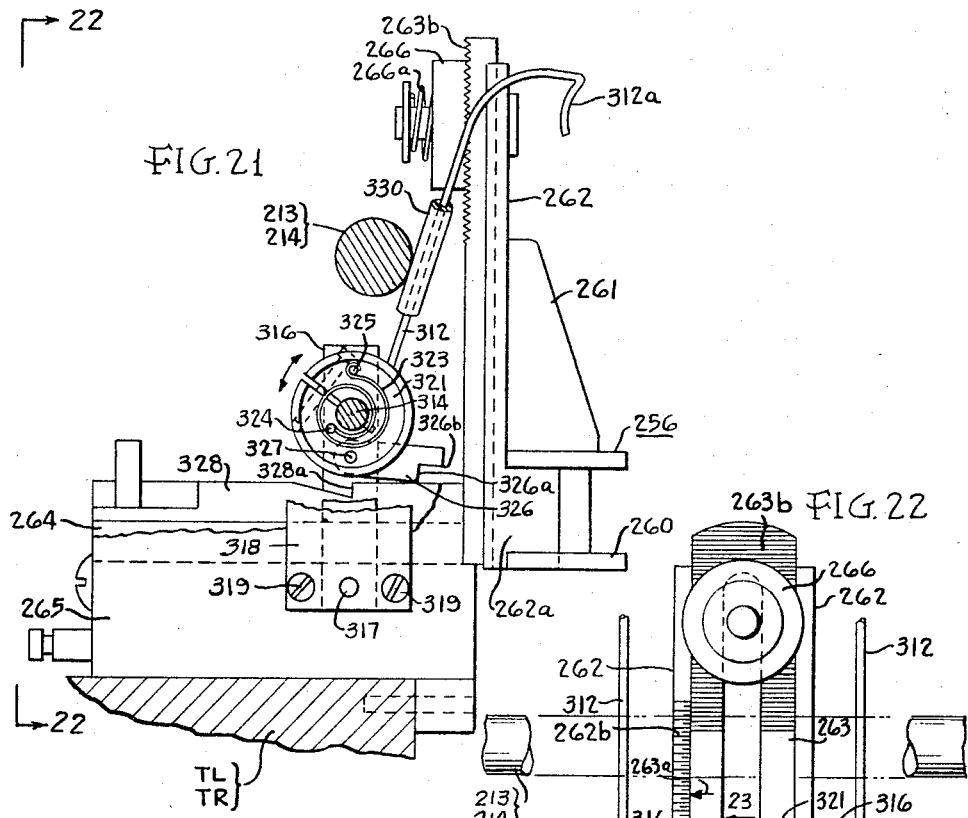
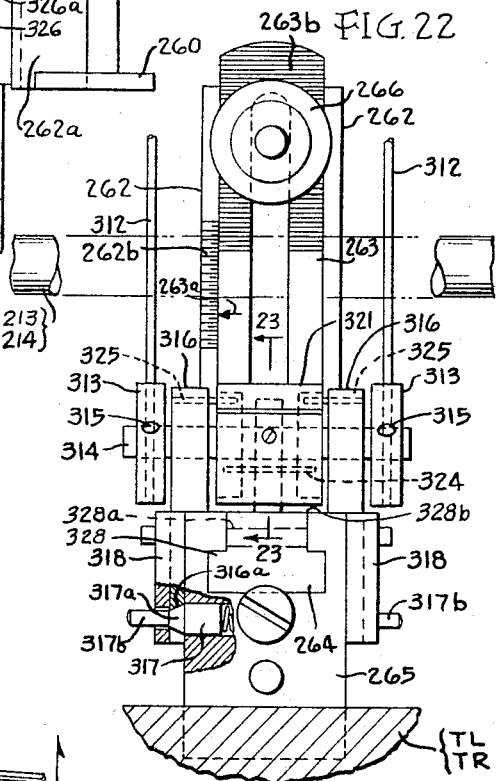
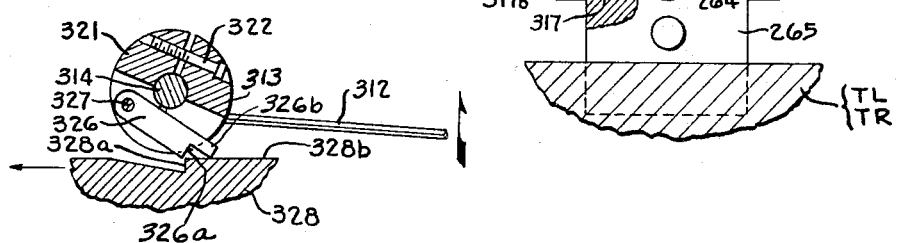

United States Patent Office 3,280,706
Patented Oct. 25, 1966

3,280,706
BOX CRIMPING AND TAKEOUT SYSTEM
John B. Bradicich, Warner, and Richard M. Sycamore, Contoocook, N.H., assignors to FMC Corporation, San Jose, Calif., a corporation of Delaware
Filed June 21, 1963, Ser. No. 289,684
8 Claims. (Cl. 93—41)

This invention relates to a box forming and staying system and has for an object the provision of an improved box crimping and takeout system.

In the manufacture of setup boxes, box blanks are fed into a box forming and staying machine where the box sides are bent up with respect to the bottom and adhesive stays applied to the respective corners of the box. In order to correct the tendency of the box sides from springing out at the top and to square the box sides with the sides of the bottom, a crimping action is applied to the box sides. This crimping action is in the nature of an overbending of the box sides by pushing in the box sides. The amount of crimping varies from one setup to another and it may vary during a box run. Various types of crimpers have been used heretofore and on prior machines it has been necessary to set each crimper individually by a trial and error method which involves starting and stopping the machine until the correct amount of crimping action is obtained on each side of the box. The present invention enables all four crimping assemblies to be adjusted simultaneously with the machine stopped or in operation and requires no attention during setup.

In accordance with the present invention, there is provided in a system for forming and staying boxes, the improvement of a crimping system for crimping the box sides to square the sides with the bottom and correct the tendency of the sides to spring out at the top comprising a pair of side crimpers and a pair of end crimpers. There is also provided drive means for reciprocating the crimpers through a predetermined operating stroke relative to the box sides and means for concurrently adjusting the stroke of the crimpers whether the machine is stopped or in operation.

It is a further object of the invention to provide a takeout system for removing boxes from the crimping and staying zone before the next box enters this zone. In accordance with this aspect of the invention, there is provided takeout means carried by the side crimpers comprising at least one arm rotatable around a horizontal axis and extending therefrom a distance adequate to engage the upper edge of the side wall of the box. The takeout means also includes means operable during the reverse stroke of the side crimpers to rotate the arm downwardly against the upper edge of the side wall of the box forcibly to eject the box from the crimping and staying zone.

It is a further object of the invention to provide a coding system to permit the operator to select without guesswork the correct interchangeable parts such as crimpers, folding rolls and takeouts of different sizes adapted to engage the walls of a box during manufacture and corresponding to the different sizes of boxes to be stayed. In accordance with this aspect of the invention, there is provided in a system for forming and staying boxes of different sizes which utilizes four corner blocks for supporting interchangeable parts including crimpers, folding rolls and takeouts of different sizes adapted to engage the walls of a box during manufacture and corresponding to the different sizes of the boxes to be stayed, the method comprising coding the interchangeable parts in accordance with the different sizes of boxes to be stayed, adjusting the corner blocks in pairs relative to a code in accordance with the width of the box to be stayed, adjusting the corner blocks in pairs relative to a second code in accordance with the length of the box to be formed and utilizing in the system interchangeable parts having the coding corresponding to the adjusted positions of the corner blocks.

For a more detailed disclosure of the invention and for further objects and advantages thereof, reference is to be had to the following description taken in conjunction with the accompanying drawings, in which:

FIG. 2 is a front elevational view of the apparatus looking in the direction 2—2 in FIG. 1;

FIG. 4 is a perspective view of the apparatus shown in FIG. 1 looking from the opposite end from FIG. 3;

FIGS. 5, 5a and 5b are fractional views of the electrical warning system for the control of the stack height of the apparatus of FIG. 1;

FIG. 6 is a fractional view of a cross-section of the sheet feeding mechanism;

FIG. 6a is a fractional view of FIG. 6 on enlarged scale;

FIG. 7 is a fractional front elevation of the adjustable gate;

FIG. 7a is a fractional sectional view on enlarged scale taken along the line 7a—7a in FIG. 7;

FIG. 9 is a perspective of one of the corner blocks and parts supported thereon;

FIG. 10 is a sectional view of one of the spring cartridge assemblies;

FIG. 11 is a fragmentary view showing the stop for the corner plunger in FIG. 9;

FIG. 12 is a perspective view of the telescoping blank side guides and scale showing box depth adjustment;

FIGS. 13 and 14 are views of the unitized stay control;

FIG. 15 is a fractional view showing the self-aligning crosshead;

FIG. 18 is a perspective view of the unitized crimper control;

FIGS. 19 and 20 are fragmentary views of FIG. 18;

FIG. 21 is an end elevation of a box takeout;

FIG. 22 is a side elevation looking in the direction of 22—22 in FIG. 21; and

FIG. 23 is a sectional view looking in the direction 23—23 in FIG. 22.

Figure 1:
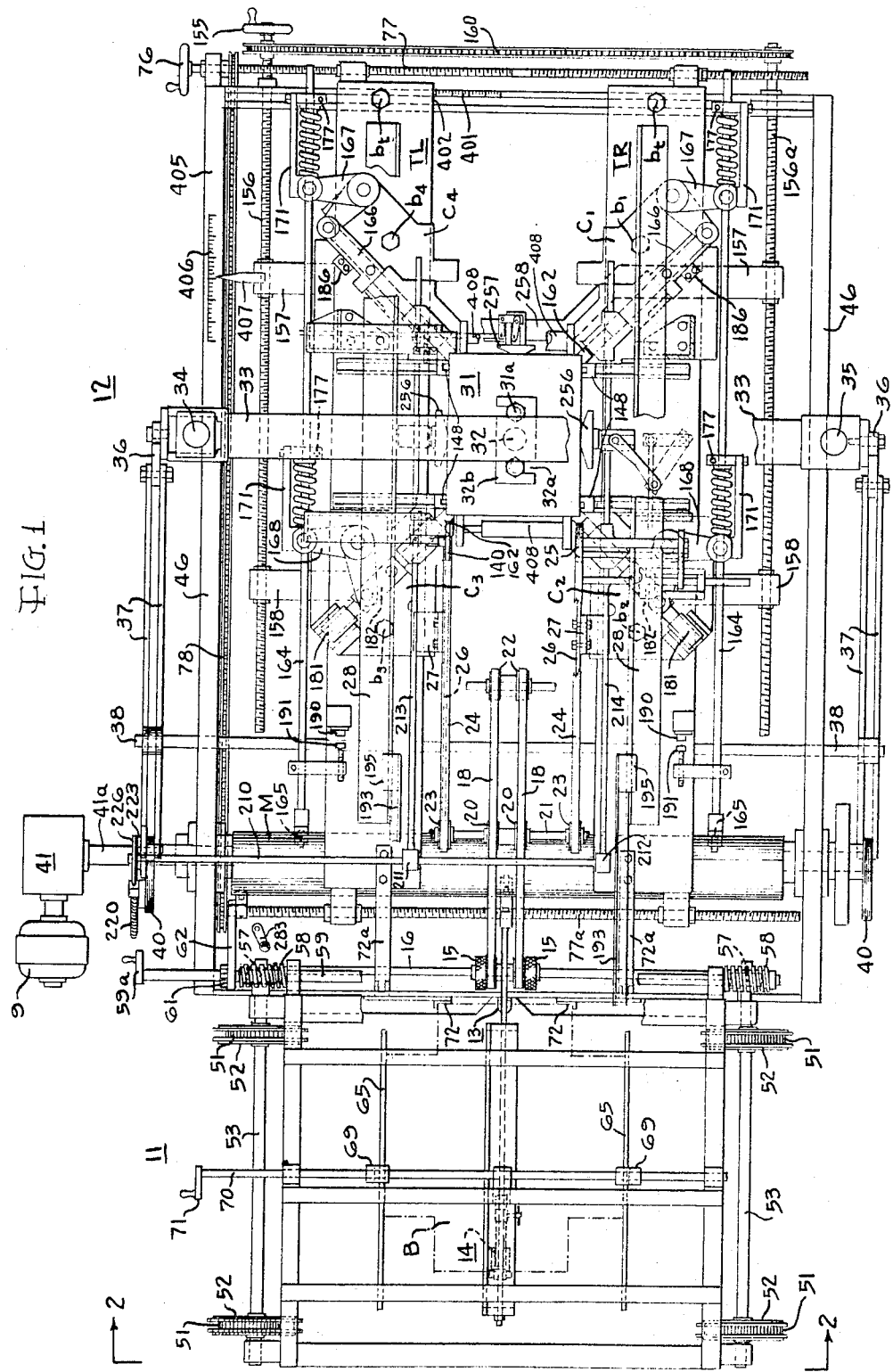
FIG. 1 is a top plan view taken from the right side of apparatus embodying the invention with certain parts broken away and the tape reels omitted for clarity.

Referring to FIG. 1, the system for making set-up boxes includes a sheet feeding assembly 11 and a box folding and staying machine 12 of the quadruple type having four adjustable corner blocks $C_1$–$C_4$ for supporting the staying mechanism. Cardboard blanks or sheets are fed one by one from the top of vertical stack of blanks B by a reciprocable starting tip assembly 14 through a gate assembly 13 which is adjusted to pass a single blank at a time to the staying machine 12. The starting tip assembly 14 engages the rear edge of the blank B and moves it a fixed distance into the nip of feed rolls 15. The feed rolls 15 are carried by a shaft 16 which is continuously driven from a drive motor 9. The driving feed rolls 15 are knurled and cooperate with upper feed rolls 15a of nylon carried on a shaft 16a shown in FIGS. 7 and 8. The driving feed rolls 15 are associated with a pair of inner belts 18 which are driven from pulleys 19, FIG. 7, on the shaft 16. The belts 18 pass over pulleys 20, FIG. 1, carried by a shaft 21, the outer ends of which extend into pulleys 23. The pulleys 23 receive a pair of outer belts 24 which also extend around pulleys 25 at the opposite ends and both pairs of pulleys 23 and 25 are carried by tractor bars 26 which are supported by brackets 27 on the front corner blocks $C_2$ and $C_3$ of the staying machine 12. The front corner blocks $C_2$ and $C_3$ are supported for concurrent adjustment lengthwise of the machine 12 respectively on the right-hand table TR and left-hand table TL as are the rear corner blocks $C_1$ and $C_4$. The opposite ends of the belts 18 pass over pulleys 22 and thus it will be seen that the drive to the pulleys 20 is from an intermediate portion of the inner belts 18. This enables the pairs of corner blocks $C_1$, $C_4$ and $C_2$, $C_3$ of the staying machine 12 to be adjusted lengthwise of the machine to accommodate boxes of different lengths without changing the overall length of the belts. The pulleys 23 are adapted for movement lengthwise of shaft 21 thus permitting transverse adjustment of the belts 24 with adjustment of tables TR and TL for boxes of different widths.

Figure 8:
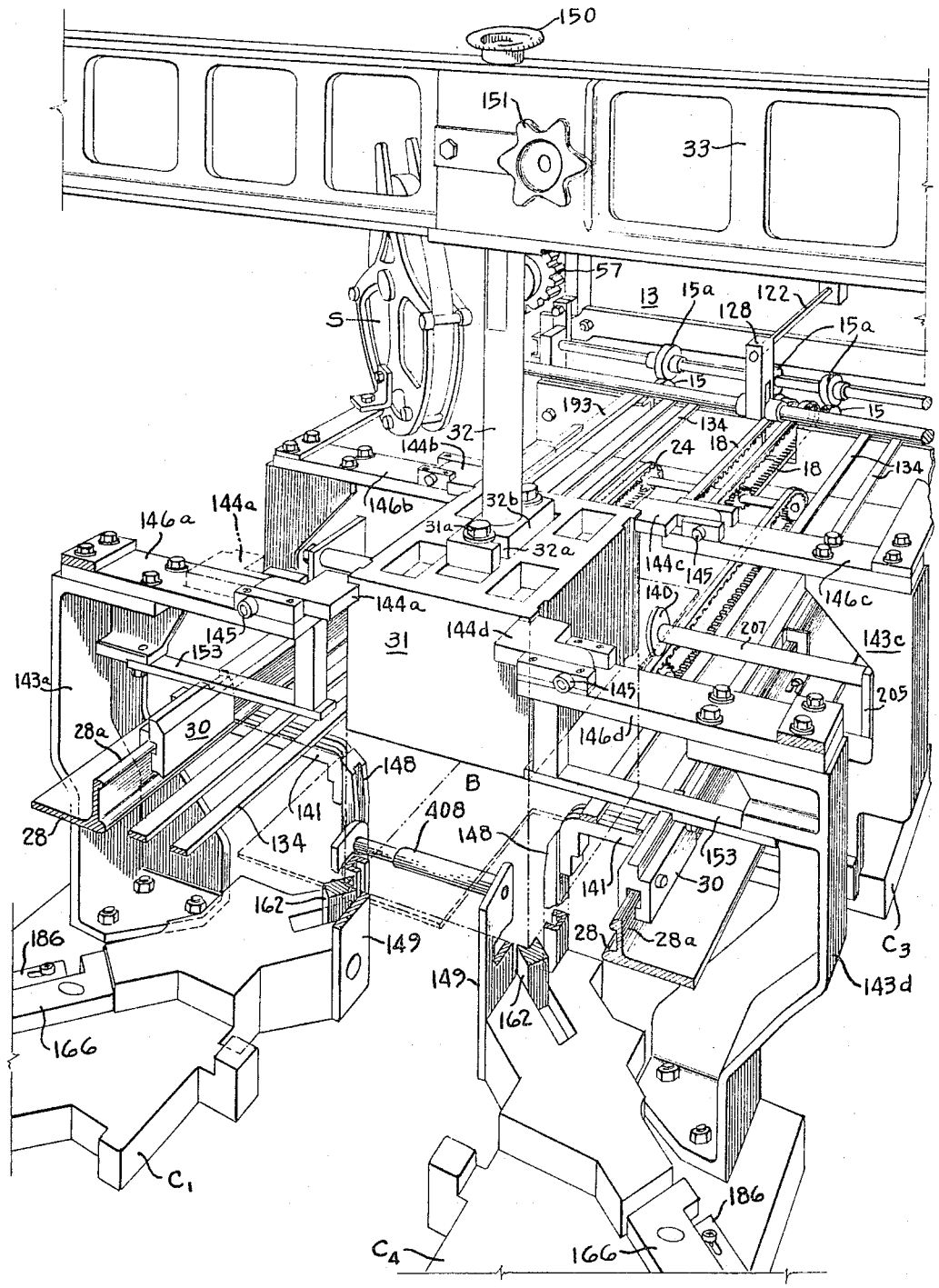
FIG. 8 is a close-up perspective view looking in the same direction as FIG. 4 and showing the plunger and associated setup gauges.

The belts 18 and 24, FIGS. 1 and 8, move the cardboard blank along side guides 28 positioned at opposite edges of the blank and against blank stops 30 which are carried by these guides 28. The blank stops 30, FIG. 8, are positioned so as to engage the corner cut of the blank and thus position the center panel of the blank directly beneath the box form 31 of the plunger. The form 31 is carried by a center plunger 32 which in turn is carried by a crosshead 33. The crosshead 33 is provided with bushings at the opposite ends which are adapted to receive crosshead shafts 34 and 35, FIG. 1. The crosshead 33 is connected at its ends by way of links 36 to cam levers 37 pivoted on cross-shaft 38, the levers 37 being driven from cams 40, FIGS. 1 and 14. The cams 40 are carried by a master shaft M which is driven through a clutch from motor 9 and is indicated schematically in FIG. 1 as a drive assembly 41. Further details of such drive assembly may be seen by reference to Twitchell et al. Patent 3,080,796; however, the details of such drive assembly do not form part of the present invention. The master shaft M also includes cam means adapted to drive various elements of the staying machine 12. It is, of course, to be understood that the cam means instead of being integral with the shaft as illustrated, FIG. 1, may comprise several individual cams carried by the master shaft M. It is further to be understood that the master shaft M has several cam surfaces having different contours to provide the desired stroke for the various parts of the staying machine.

After a box blank has been formed and the stays S applied, the side walls of the box are crimped and the finished setup box is discharged from the machine by way of a discharge conveyor 44, FIG. 4. Having given a general description of the operations involved in forming a stayed set-up box, a more detailed description now will be given of the various portions of the box staying system.

Referring to FIG. 1 and FIG. 4, it will be seen that the staying machine 12 is mounted on a rectangular main frame 46 which is in turn carried by a base frame 47, FIG. 4. The base frame 47 provides the legs 47a which support the staying machine 12. The sheet feeding assembly 11 is also supported by the main frame 46 and by the base frame 47.

Stack feed and blank guides

As may be seen in FIG. 2, the stack of blanks B is carried by a tray 50. The opposite sides of the tray 50 are carried by two pairs of elevating chains 51, FIGS. 1 and 2. The elevating chains 51 are identical and as may be seen in FIG. 2, the upper ends of the chains 51 are carried by sprockets 52 which in turn are carried by driven shafts 53. The lower ends of the chains 51 are carried by sprockets 54 which in turn are carried by shafts 55. As may be seen in FIG. 1, the shafts 53 are provided with worm wheels 57 which are adapted to be driven from worms 58 carried by a shaft 59. The shaft 59 is driven from a ratchet 61 which is operated by an arm 62 which is operated by a cam roller from master shaft M. As may be seen in FIGS. 2 and 3, the chains 51 comprise a series of links 64 which have outwardly extending projections 64a. Each of the links 64 is identical but every other link is assembled in reverse position. The outwardly extending portions 64a provide ledges for receiving the corresponding edges of the tray 50, FIG. 2. The projections 64a are freely accessible at any elevation as may be seen in FIGS. 2 and 3 and thus the tray 50 may be inserted or withdrawn regardless of the heighth of the stack of blanks B. It is, of course, to be understood that the lower limit for the tray 50 will be determined by the center line of the bottom shaft 55, FIG. 2.

Figure 3:
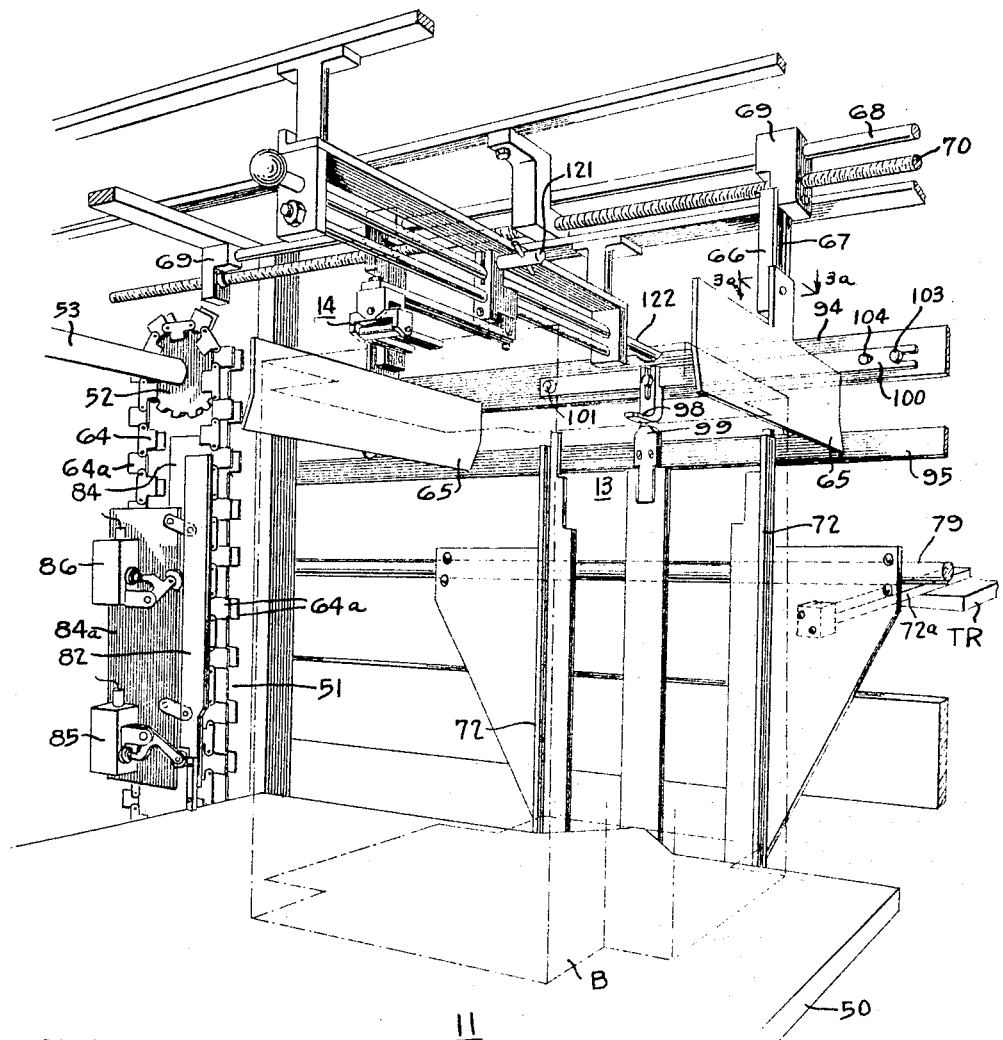
FIG. 3 is a fractional perspective view looking in the direction of FIG. 2 and showing the sheet feeder.
Figure 3A:
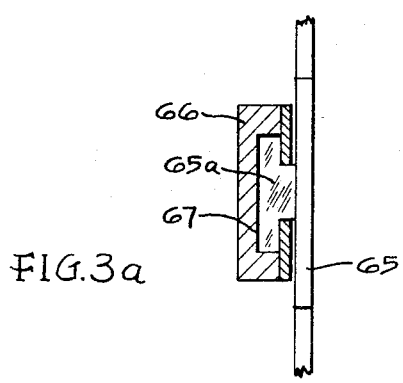
FIG. 3a is a section taken along the plane 3a—3a in FIG. 3.

It will be noted in FIGS. 2 and 3 that the upper end of the stack of blanks B is engaged on the opposite sides by a pair of feeder side guides 65, 65. The feeder side guides 65 are supported from above by channels 66 having closed end T-shaped slots 67, FIG. 3, which are adapted to receive a corresponding T-shaped section 65a, FIG. 3a, carried by the upper end of the guides 65. As the tray 50 is raised, if it hits the bottom of the side guides 65, they will automatically be raised in the channel slots and thus prevent damage to them by the tray. The channels 66 are supported in depending position from blocks 69 which are carried by a lead screw 70 and a guide rod 68. The opposite ends of the lead screw 70 are provided with left-hand and right-hand threads which mate with corresponding threads in the respective blocks 69 so that the blocks 69 may be concurrently moved together or apart by rotation of the lead screw 70. The rotation of the lead screw 70 is accomplished by means of a hand wheel 71, FIG. 1. The feeder side guides 65, 65 cooperate with right angle front pile guides 72, 72, FIG. 3, which engage forward corners of the blanks in the pile. The front pile guides 72 are carried by brackets 72a on the two tables TR and TL which in turn are adjustably carried by the main frame 46 of the machine in FIG. 1. The tables TR, TL are adapted to be adjusted transversely of the machine 12 by means of a handle 76 on lead screw 77 to accommodate boxes of different widths. The lead screw 77 is provided with right and left-hand threads at the opposite ends for concurrently adjusting the tables TR and TL. The opposite end of the frame is provided with a lead screw 77a similar to lead screw 77 and which is operated through a chain 78 to adjust both ends of the tables concurrently relative to the longitudinal center line of the machine. As will later be described, various components of the staying machine are supported by the tables TR and TL and thus are concurrently adjusted with the tables for different widths of boxes. The front pile guides 72, FIG. 3, are adapted to slide on a guide rod 79 and thus maintain the front pile guides in a vertical position. The front pile guides 72 cooperate with the feeder side guides 65 in maintaining the longitudinal center line of the blanks in alignment with the longitudinal center line of the machine and box form 31 as the blanks B are fed through the gate assembly 13 and into the feed rolls, FIG. 1.

Blank supply warning signal system

In FIG. 5 it will be seen that provision has been made for a warning signal system to indicate to the operator the extent of the supply of blanks remaining on the tray. The signal system is illustrated as electrically operated from a suitable source of power such as lines $L_1$, $L_2$. When the tray is full of blanks as shown in FIG. 2, the signal lights 80, 81 are extinguished, FIG. 5. The tray 50 is raised to higher elevations due to depletion of the blanks from the stack. It will arrive, eventually at the position shown in full line in FIG. 5. In FIG. 5, the tray 50 has engaged the lower end of a tray detector 82 which is connected by a pair of links 83 to the chain backing bar 84. The links 83 permit a parallel motion of the detector 82 as it is raised by the tray 50. As may be seen in FIGS. 2, 3 and 5, there is a pair of microswitches 85 and 86 carried by the member 84a on chain backing bar 84. The microswitch 85 is normally closed but is being held open by the corner 82a of detector 82. This is shown in full line in FIG. 5. At the same time, the microswitch 86 is in a normally open position as shown in full line in FIG. 5. Thus, both of the warning lights 80 and 81 are extinguished. As the tray 50 moves upwardly in FIG. 5, it engages the lower extension 82b on detector 82 and causes the detector 82 to move in an upward direction. As member 82 moves upwardly, it permits the cam follower for the actuator 85a for microswitch 85 to move to the position of FIG. 5a thereby permitting the contacts in microswitch 85 to return to their normally closed position and completing the circuit to the amber warning light 81. This signals to the operator that the stack of blanks B is nearing depletion and a new stack will soon be required. As the tray 50 moves to a higher elevation in FIGS. 5 and 5b, it will engage the shoulder 82c on the inner edge of detector 82 causing the detector 82 to pivot the links 83 upwardly and move the detector 82 against the cam follower on the actuator 86a for microswitch 86. This action closes the contacts for switch 86 completing a circuit to the red warning light 80 thereby indicating to the operator that the tray 50 must be replaced immediately with a new supply of blanks otherwise the machine will need to be shut down for loading. At the same time that the red warning light 80 is turned on by switch 86, it will be noted that the extension 82b on detector 82 has moved to the left in FIGS. 5 and 5b causing the cam follower on the actuator 85a for switch 85 to be moved downwardly to the full line position thereby opening the normally closed switch 85 and turning off the amber light 81.

It will also be noted in FIG. 5 that there is a green signal light 88. The purpose of the green signal light 88 is to indicate to the operator when the level of the stack of blanks or sheets is in the correct position with respect to the opening in the gate of gate assembly 13. It is necessary that the top of the stack be in alignment with the opening in the gate in order that a sheet will be fed into the staying machine. If the machine 12 is operated when no blank is fed, the machine will apply stay tape from the stay tape reels S to the sides of the form block 31, FIGS. 1, 4 and 8, rather than to the corners of a box. The gate assembly 13, FIGS. 5–7, is carried at its opposite ends by a pair of arms 91 which are pivoted at their rear ends at 91a, FIG. 6. This enables the gate assembly 13 to have a vertical floating motion and it will float within a narrow angle. When the top of the stack of blanks is in alignment with the opening in the gate assembly 13, the arm 91, FIG. 5, will move upwardly permitting the switch 92 to move to its normally closed position thereby completing a circuit through the green signal light 88 indicating to the operator that the stack height is at the proper level and that the staying machine 12 may be turned on. At the same time, the switch 92 energizes the solenoid 93 which operates on the ratchet 61, FIG. 1, and causes the chains 51 to stop feeding the stack of blanks. The operation of the solenoid and ratchet is similar to that described in Twitchell et al. Patent 3,016,240. After a few sheets have been fed from the top of the stack this will cause the floating gate assembly 13 to move downwardly opening the normally closed switch 92 deenergizing the solenoid 93 and causing the ratchet 61 to elevate the chains 51 again moving the top of the stack of blanks to the proper level. It will, of course, be understood that when the switch 92 is opened, the green signal light 88 will be turned off indicating to the operator that the stack level is low. However, once the machine is started this operation is automatic as long as there is a stack of blanks on the tray and the level of the stack will be automatically raised to compensate for the depletion in the stack due to the sheets being fed into the staying machine. While the foregoing description has been in connection with an electrical warning system, it is to be understood that hydraulic or pneumatic systems may be used and other types of warning devices may be utilized including audible as well as visual devices.

Gate assembly

Referring to FIG. 7, the gate assembly 13 includes a pair of spaced cross members 94 and 95 which are held apart in fixed spaced relation by a pair of end members 96, only one of which is shown in FIG. 5. The upper cross member 94 supports the upper gate member 98 and the lower cross member 95 supports the lower gate member 99. The lower gate member 99 is supported in fixed position relative to the stack while the upper gate member 98 is adapted to be adjusted to accommodate different thicknesses of sheets. This is accomplished by supporting the upper gate member 98 intermediate the ends of a member 100 which is pivoted at its left-hand end at pivot 101 which, in turn, is carried by the upper cross member 94. To provide preliminary adjustment of the upper gate member 98, it will be seen in FIGS. 6 and 7 that the gate member 98 is slotted at its upper end 98a and a clamping screw 102 is adapted to extend through the slot 98a and secure the upper gate member 98 to the pivoted member 100. The cap screw 102 provides for the major adjustment of the gate opening; however, at the right-hand end of pivoted member 100 there is an eccentric member 103 which is mounted for free turning on the upper cross member 94. The eccentric member 103 extends through a slot 100a, FIG. 7a, in pivoted member 100 and provides micro-adjustment for the spacing between the upper gate member 98 and the lower gate member 99. The spacing between the gate members is set so as to permit only one sheet to be passed through the gate at one time. In practice, this spacing will correspond to the thickness of one sheet plus a slight additional clearance ordinarily corresponding to the thickness of a stay strip. When the spacing of the gates is correctly determined, the upper gate member 98 is locked in position by means of a knurled hand screw 104 which extends through an oversize hole 100b in member 100 and into cross member 94. A shoulder on the screw 104 will hold the member 100 tightly against the cross member 94. It will be noted that the micro-adjusting screw 103 is positioned a substantial distance from the pivot 101 and this enables the operator to adjust the spacing of the gate members while the machine is running. Also, it will be noted that the upper gate member 98 is carried at a position relatively close to the pivot 101 and, thus, the rotation of member 100 by eccentric 103 about pivot 101 provides very small movement of the gate 98. While this movement is on an arc, there is sufficient surface between the upper and lower gate members 98 and 99 so as not to interfere with the feeding of a sheet.

Starting tip assembly and actuating mechanism

In FIGS. 3 and 6 there is illustrated the starting tip assembly 14 and drive mechanism therefor which is adapted to feed the top sheet from the stack into the staying machine. The top gate member 98 includes a foot which is adapted to rest on the top of the stack of sheets at the forward end and the starting tip assembly 14 moves the top sheet from the stack between the upper and lower gate members 98 and 99, FIG. 6. The starting tip assembly 14 includes a U-shaped tip holder 114 having a tip blade or shoulder 114a at the closed rear end of the U which is adapted to engage the rear edge of the top sheet in the stack. The bottom horizontal surfaces 114b of the legs of the U-shaped starting tip holder 114 engage the top surface of the top sheet in the stack. The depth of the shoulder 114a is less than the thickness of the sheet to be fed. The starting tip holder 114 is carried in pivoted depending relation on a pivot 115a which in turn is carried from a body 115. The body 115 comprises a universal joint including two U-shaped members 115b and 115c. The lower member 115b receives the pin 115a to support the starting tip holder 114 while the upper U-shaped body member 115c supports a pin 115d which extends through the lower body member 115b. The upper member 115c of the body is carried by a pivot 116 which is carried by an arm 117. The body 115 is maintained in predetermined relation to the starting tip arm 117 by means of spring plungers 118 which are carried by the arm 117 and extend into the upper member 115c of body 115. The arm 117 is carried by a starting tip slide or block 120 which includes a split upper portion 120a and is clamped by a screw 121 to a reciprocating actuating shaft 122 and is free to slide on bearing sleeves 120b on starting tip shaft 123. The actuating shaft 122 is adapted to reciprocate through the supporting end members or starting tip bearings 124 which are supported from a top support or starting tip frame 125, the latter being supported from the upper portion of the frame of the stack feeder 11. The actuating shaft 122 is reciprocated by means of a yoke 128 at the right-hand end which is adapted to receive a cross shaft 129 which is carried by the upper end of a pair of arms 130, the lower ends of which are secured to a shaft 131 which is adapted to be rotated by the crank 62 which in turn is oscillated by the master shaft M and a return spring 132. With this arrangement, it will be seen that the actuating shaft 122 will make a uniform stroke of fixed length during each cycle of the master shaft M. Thus, the leading edge of a blank or sheet B will move a fixed distance from the gate assembly 13, FIG. 6, to the nip of the feed rolls 15 and 15a regardless of the length of the sheets.

Since the sheets are being fed from the rear edge, it is necessary to adjust the starting tip assembly 14 in accordance with the length of the particular sheet being fed. This is accomplished by loosening the clamping screw 121 on the actuating shaft 122 and moving the block 120 therealong until the starting tip assembly 14 has been positioned correctly with respect to the rear edge of the sheets. The screw 121 is then tightened on the actuating shaft 122. In order to accommodate blanks of a wide range of lengths, it will be noted that the arm 117 is pivotally carried from the block 120 by means of a depending U-shaped portion or turret 120c on a pivot 120d. The arm 117 is pinned to turret 120c at 117a and is held in fixed position relative to the block 120 by means of a spring-biased plunger 119. An adjustment screw 117b permits adjustment of arm 117 about pin 117a. By rotating the arm 117 about the pivot 120d through an angle of 180°, the starting tip assembly 14 will be positioned so that it faces in the opposite direction to that in full line in FIG. 6. However, by rotating the starting tip assembly 14 about the pivot 116, it will assume the phantom line position illustrated in FIG. 6 and thus be in proper position to feed the small blanks. The spring-biased plungers 118 and 119 enable the starting top assembly 14 to be adjusted for the different size blanks without the need of tools and thus contributes to reducing the overall time required to change over the machine from one size of box to another.

As later to be described in detail, the machine 12 is stopped with the box form 31 in the up position. Provision has been made to adjust the various parts of the machine with the form in the up position and without the need for turning the machine over and running it through a cycle by hand. With the form in the up position as shown in FIG. 8, the starting tip assembly will be in its forward position at the end of its forward stroke. In order to determine the position for the starting tip assembly 14 for the new size of blank to be run, there is provided a gauge 133, FIG. 6a, formed from a strip of metal and having a rear shoulder 133a which is adapted to engage the rear edge of the stack of blanks. The gauge 133 also has a forward shoulder 133b which is spaced from the rear shoulder 133a a distance corresponding to the fixed length of stroke of the starting tip assembly 14. When adjusting the starting tip assembly 14 to a new size of blank, the screw 121, FIG. 6, is loosened and the gauge 133 is placed on the stack of blanks as in FIG. 6a. The shoulder 114a on the starting tip assembly 14 is moved into engagement with the forward shoulder 133b of the gauge, and the screw 121 is then tightened so that the starting tip slide 120 will be secured to the actuating shaft 122 in the adjusted position. The gauge 133 is then removed and the starting tip assembly 14 will be properly positioned on actuating shaft 122 for feeding the new size of sheets.

After the blanks pass through the gate 98–99, they are received by the cooperating rollers 15, 15a, FIG. 6, which feed the blanks forward across spaced guide rails 134, FIG. 8, and onto the pair of inner belts 18 and the pair of outer belts 24 to move the blank against the forward alignment blocks 30. The alignment blocks 30 are carried by top guides 28 for the blanks. The top guides 28 are of a channel construction as may be seen in FIGS. 8 and 12 and are adapted to engage the edges of the sides of the blank. The forward corner cuts of the blank are adapted to engage the ends of blocks 30, FIG. 8, and thus the latter serve as end stops for the blank and position the blanks accurately with respect to the center lines of the center plunger form 31. To insure that the blanks are moved completely against the stops 30, there is provided a pair of nylon wheels 140 which force the blanks down against the outer feed belts 24 thus causing the blank to be driven against the stops 30. The guides 28 for the edges of the blank rest on brackets 141, 141a, FIGS. 8 and 12, one pair of which is carried by the corner blocks $C_1$, $C_2$ and another pair being carried by the corner blocks $C_3$, $C_4$. It will be recalled in FIG. 1 that corner blocks $C_3$ and $C_4$ are mounted on table TL and that corner blocks $C_1$ and $C_2$ are mounted on table TR. Thus when the tables are moved relative to each other to accommodate boxes of different widths, the guides 28 for the side walls of the box blank will likewise be concurrently moved along with the corresponding corner blocks.

*Set-up gauges and method of use*

The corner blocks $C_1$–$C_4$, FIG. 8, are respectively provided with supports 143a–143d which support pivoted set-up gauges 144a–144d. The setup gauges 144a–144d are carried by pivots 145 which in turn are carried by arms 146a–146d. The gauges 144a–144d are provided with notches at their inner corners which are adapted to engage the corresponding corners of the form 31 when the gauges 144a–144d are pivoted to their gauging position as shown in full line in FIG. 8. As illustrated, the form 31 is in its up position and the form supporting bolts 31a which extend through the open end slots 32a in the form foot 32b should be loosened. Thus, when the corner blocks $C_1$–$C_4$ are adjusted relative to the corners of the form 31, the setup gauges 144a–144d will engage the respective corners of the form 31 and square it with respect to the corner blocks $C_1$–$C_4$. The bolts 31a may then be tightened thus locking the form 31 in properly centered and squared position with respect to the center plunger 32. The form depth may also be set with the form 31 in the up position as the top of the setup gauges 144a–144d are in the same relative position with the form 31 up as the stay cutting knives are when the form 31 is down. One of the movable knives 152 carried by the corner pressers 162 is shown in FIG. 9. The stay mechanisms are adapted to be driven from shafts as later to be described in connection with FIGS. 13 and 14. Each of the corner blocks $C_1$–$C_4$ carries a stay mechanism which may be of any known type, such for example, as the type disclosed in FIGS. 8 and 9 of Twitchell et al. Patent 3,080,796.

The setup gauges 144a–144d are so positioned as to provide proper box board clearance between the form 31 and side folders 148 and end folders 149, FIG. 8. The setup gauges 144a–144d may be adjusted relative to the respective corner blocks $C_1$–$C_4$ in order to compensate for different thicknesses of box board. This may be accomplished by providing the main supports 143a–143d with oversized holes where they are attached to the corner blocks or by adjusting the setup gauges relative to their supporting arms 146a–146d. Ordinarily, a change is not necessary when the board thickness is up to .050" which is the usual setting at factory. The end folders 149 and side folders 148 are positioned back of the corresponding edges of the setup gauges a corresponding distance. To adjust the form 31 for the correct depth of box, a mark is placed on the side of the form 31 corresponding to the depth of box to be run. The center plunger 32 is adjusted vertically by means by a hand knob 150 until the mark on the form 31 is in alignment with the top of the setup gauges 144a–144d. At this time, the form 31 will have been adjusted to the correct position for the corresponding depth of box and the center plunger 32 is then locked in position by means of the hand screw 151.

When the corner blocks are adjusted to their proper position relative to the ends of the form 31, they likewise adjust the end stops 30 for the blanks to the proper position. The end stops 30 are free to slide on the vertical portion 28a of the guide rails 28 which move with corner blocks $C_2$ and $C_3$. A pair of stop guide supports 153 are mounted on the main supports 143a and 143d and move with the corner blocks $C_1$ and $C_4$. The stop guide supports 153 extend through notches in the upper portion of the end stops 30, FIG. 8. This causes the end stops 30 to move lengthwise of the blank guides 28 whenever the corner blocks $C_1$–$C_4$ are adjusted lengthwise of the tables by means of hand wheel 155 on lead screw 156, FIG. 1. The lead screw 156 is provided with right-hand and left-hand threads at the opposite ends for concurrently adjusting the cross members 157 and 158 which respectively connect corner blocks $C_1$ with $C_4$ and $C_2$ with $C_3$. The opposite ends of the cross members 157 and 158 receive corresponding threaded sections of a lead screw 156a, similar to lead screw 156, which is operated through a chain and sprocket connection 160 to adjust both ends of the cross members 157 and 158 with respect to the center plunger 32. Thus it will be seen that adjustment of hand wheel 76, which adjusts tables TL and TR, will adjust the pair of corner blocks $C_3$, $C_4$ relative to the pair of corner blocks $C_1$, $C_2$ to provide width adjustment while adjustment of hand wheel 155 will adjust the pair of corner blocks $C_1$, $C_4$ relative to the pair of corner blocks $C_2$, $C_3$ to provide length adjustment.

Each of the corner blocks $C_1$–$C_4$ is provided with a corner plunger 162, FIGS 1, 8 and 9, for pressing the stay strips to the respective corners of the setup box. The corner pressers 162 are mounted diagonally on each corner block and are adapted to simultaneously shear the tape at the upper edge of the box while pressing a length of the stay tape against the respective corners of the box. The tape may be of any suitable type such as gummed or pressure sensitive or thermoplastic. The forward end of each corner presser 162 is provided with a right dihedral angle for engaging the tape at the corners of the box. The drive for the corner pressers 162 is from a pair of pull rods 164 which are reciprocated from cam surfaces on the master shaft M by way of cam followers 165, FIG. 1. The pull rods 164 are connected through bell cranks 167 and pivoted presser links 166 to the corner plungers 162 on corner blocks $C_1$ and $C_4$ while bell cranks 168 connect pull rods 164 to the presser links 182 pivoted to the corner plungers 162 on corner blocks $C_2$ and $C_3$. The corner pressers 162 and their operation as thus far described is similar to that disclosed in Twitchell et al. Patent 3,080,796.

*Spring cartridge assemblies*

As may be seen in FIG. 1, one arm of each of the bell cranks 167, 168 is connected to a pin on the links 166, 182 of the corner pressers 162 while the other arms of the bell cranks 167, 168 are pivotally connected to one of the ends of spring cartridge assemblies 171. As may be seen in FIGS. 1 and 10, each of the spring cartridge assemblies 171 includes a compression spring 172 which may be referred to as an overload relief spring. The function of the springs 172 is to transmit the drive from the cam surfaces on master shaft M, FIG. 1, through the pull rods 164 to the corner pressers 162. The springs 172 also serve as overload relief springs in case of maladjustment of the parts, interference or jamming. The construction of the spring cartridges 171 is shown in cross section in FIG. 10. Each of the cartridges 171 includes an L-shaped member 173 which has an opening in the short leg thereof to receive the push rod 164. The long leg of the L-shaped member 173 is provided with a pair of slots 173a through which a pair of locking screws 174 extend. The inner ends of screws 174 are threaded into a solid portion of split block 175 through which extends the pull rod 164. The block 175 is provided with a serrated surface 175a which is adapted to mate with a corresponding serrated surface 173b on member 173. This permits adjustment of block 175 lengthwise of member 173 and when the screws 174 are tightened, they will lock the serrated faces 175a and 173b together. A clamping screw 177 passing through the split ends of block 175 locks the cartridge 171 to the push rod 164. The block 175 is provided with a shouldered sleeve 176 which is adapted to engage one end of the compression spring 172. The opposite end of the spring 172 engages a sleeve member 178 which slides on the push rod 164. One end of member 178 engages a flat surface 179a on a pivot pin 179 which extends through one arm of the bell cranks 167, 168. The opposite face 179b of the pivot pin 179 is also flat and engages the short leg of the L-shaped member 173. The force of the spring 172 can be adjusted by moving the block 175 relative to the L-shaped member 173. This is accomplished by loosening the screws 174 and adjusting them lengthwise of slots 173a. Ordinarily, once the spring cartridges 171 are set at the factory with a predetermined spring pressure, it is not necessary to reset them. Since the cartridges 171 are adjustable lengthwise of the pull rod 164 merely by loosening the clamping screw 177 and then tightening them when the cartridges 171 have been moved to a new position on the push rod 164, it is possible to maintain a predetermined pressure on the springs 172. This is particularly desirable since misadjustment of the spring pressure will create problems in operation of the corner pressers 162. If the pressure is too low, the stay strips will be improperly applied to the corner and if the pressure is too high, the corner pressers will damage the corners on the wooden form 31 around which the box blanks are shaped. In Patent 3,080,796, it was necessary to secure both ends of the spring to the push rod each time the machine was adjusted for boxes of different sizes. This increased the possibilities of the operator to misadjust the spring pressure when he tightened the springs on the push rods after each adjustment.

*Corner plunger stops*

Each of the corner blocks $C_1$–$C_4$ is provided with a corner plunger stop in order that the machine may be provided with a correct setting without the necessity of cycling the machine. The usual practice with prior machines has been to cycle the machine while changing the setting. This enabled the operator to see that each of the various parts of the machine assumed the proper position for the new setup. One of the important features of the present machine is the fact that these various adjustments can be made without cycling. As described above, the form block 31 is in its up position when the machine is adjusted for a new size of box. When a new size of box is to be produced, a new form is used and this also requires a new setting for the corner plunger. As may be seen in FIGS. 9 and 11, the corner block C₃ carries a corner plunger stop 181 which is adapted to engage the rear end of the presser link 182 pivotally carried by the corner plunger 162. The pin 182a, FIG. 9, is adapted to connect with one of the arms of the bell cranks. The corner plunger stop 181 is in the shape of an angle, FIG. 11, and is provided with a pair of slots through which extend screws 183 which secure the corner stop 181 to the corner block C₃. Once the correct position for the corner stop 181 is determined, it need not be reset. As may be seen in FIG. 1, the corner plunger stop 181 for corner block C₂ is the same as that for corner block C₃. Corner plungers 162 for the corner blocks C₁ and C₄ have presser links 166 which are of different shape from the presser links 182. The presser links 166 have a shoulder on the side which is adapted to engage the corner plunger stops 186. The corner plunger stops 181 and 186 are all preset during manufacture of the machine so that the corner plungers 162 will all have the same retracted positioned with respect to the center plunger which supports the form.

On prior machines the practice was to adjust the machine with the form in the down position and in such manner the corner plungers were moved in against the corners of the form and then they were tightened in that position. In accordance with the present method, the form is in the up position when it is adjusted and thus the corner plunger stops 181 and 186 insure that all of the corner plungers 162 are pushed to the rear position during adjustment. If the corner plungers are not in the rear position, they would be too far forward when the machine was started up again. The corner plungers 162 move a fixed distance for each stroke, the distance in one installation being about 1 5/16". This stroke is fixed regardless of the size of the box. When the corner plunger stops 181, 186 are made of metal, it is desirable that the presser links not be permitted to strike them during each stroke of the machine as this would tend to drive the corner plunger stops out of their preadjusted positions. In order to avoid this, provision has been made as shown in FIG. 1 for pivoted plastic bumpers 190 to be engaged by stops 191 on the pressure rods 164 to prevent the corner plungers from being moved back against the stops during each stroke. It is of course to be understood that the corner plunger stops themselves may incorporate the bumper by being made of nylon or similar resilient material.

*Telescoping blank guides*

As pointed out above in connection with FIG. 8, when adjustments are made to accommodate boxes of different widths, the blank guides 28 which carry the end stops 30 are adjusted transversely of the machine 12 concurrently with adjustment of the tables. To enable the machine to be adjusted for boxes of different lengths, the guide members 28, which are carried by corner blocks C₂ and C₃, FIGS. 1 and 12, have connected to their forward ends telescopic extensions 193. One end of the telescopic extension is connected to a member 194 fixed to the frame of the machine and the other end of the member 193 is connected to an angle member 195 which is adapted to slide along the vertical edge of the guide members 28. Thus, it will be seen that the members 193 telescope with respect to the guide members 28 during adjustment of the corner blocks of the machine for boxes of different lengths.

There is another adjustment to the guide members 28 and this adjustment varies depending upon the depth of the box. It will be appreciated that the depth of a box may vary even though its length and width dimensions remain the same. For deeper boxes, it is necessary to move the guides 28 farther apart to accommodate the deeper side panels of the box.

As may be seen in FIG. 12, the forward ends of the blank guides 28 are supported on angle brackets 141a which are carried by elongated member 26 on bracket 27 fixed to the corner blocks C₃, C₂ of the machine while the opposite ends of the side guides 28 are supported by the brackets 141, FIG. 8, which are carried by the corner blocks C₄ and C₁, respectively. It is to be understood that the guides 28 merely rest on the angle brackets 141 and 141a and are not secured to them. The reason for this is to permit the adjustment for boxes of different depths as now to be described. As may be seen in FIG. 12, the side guide 28 is provided with a depth gauge or side gauge including a scale member 198. The inner ends of scale member 198 and a member 199 are secured to a sliding block 200 and to the horizontal portion of the side guide 28 while the outer ends of members 198 and 199 are secured to a sliding block 201. The blocks 200 and 201 are adapted to slide on a rod 202 carried by elongated member 26 which in turn is mounted on bracket 27 on corner block C₃. The block 201 is locked to the rod 202 by means of a thumb screw 203. The rod 202 passes through an opening in a vertical plate 205 which is supported from another rod 206 which also is supported from elongated member 26. The plate 205 provides a support for rod 207 which carries the nylon wheel 140. The plate 205 also functions as an index member with respect to the scale carried by member 198 and which is calibrated, as in inches, to indicate the correct adjustment for the corresponding depth of box. Thus, for example, for setting the side gauge to accommodate a box depth of 4", the thumb screw 203 will be loosened and the side guide 28 moved relative to the indicating plate 205 until the plate is in alignment with the marking on scale 198 corresponding to 4". This will adjust properly the side guide 28 to accommodate box blanks which have side panels with a depth of 4". Since the end stops 30 are carried by the side guide 28, FIG. 8, the end stops 30 will also be adjusted concurrently to the correct position along the arms 153.

*Stay adjustment mechanism*

When boxes of a different depth are being run, it is necessary to adjust the machine so that it will apply stay strips of a corresponding different length. The drive for the stay applying mechanism carried by the respective corner blocks C₁–C₄, FIG. 1, is through the rotatable shaft 210 and right angle gear connections 211 and 212 to rotatable shaft 213 and 214. This portion of the drive is similar to that described and illustrated in Twitchell et al. Patent 3,080,796. The right angle drives 211 and 212 may be adjusted lengthwise of the shaft 210 concurrently with adjustment of the tables TL and TR to accommodate boxes of different widths.

The apparatus disclosed herein includes a unitized stay control which permits adjustment of the length of stays while the machine is running. In prior machines, it was necessary to stop the machine to adjust the stay length. The present apparatus also provides protection for any overload on the stay feeding stands such as might occur if the stay paper is jammed. Mounted on the outer end of the shaft 210, FIGS. 13 and 14, is a ratchet or overrunning clutch assembly 215 of conventional design, and having an arm which is connected to a link 217 having a slot 217a in the lower end of it. A pin 218 is carried by the eccentric cam 40 on the outer end of the master shaft M. The pin 218 extends through the slot 217a and is provided with a collar 219 which forms a movable stop at one end for the compression spring 220 on link 217. The opposite end of the spring 220 engages a fixed stop 221 pinned to the lower end of the link 217. The pin 218 rotates with the shaft M and rides up and down in the slot 217a against the pressure of compression spring 220. The shaft 210 extends through a plate 223 which is supported from the frame 46. The plate 223 is provided with an arcuate slot 223a, calibrated as to stay length, through which a locking device 224 extends, the latter being carried by a lever arm 226 pivoted on the shaft 210. The locking device has a clamp 224a on the rear, FIG. 13, which clamps the lever 226 in fixed position against plate 223. The lever arm 226 carries a stop member 227 which is adapted to be engaged by the upper end 215a of the ratchet member 215. When such engagement occurs, collar 219 slides along link 217 compressing spring 220 and thus no further rotation of shaft 210 takes place.

By moving the handle 226 to different positions along the calibrated scale adjacent slot 223a, the length of stay strips is changed. When the lever 226 is at the right-hand end of slot 223a, the pawl 215a cannot move and thus no stays are fed. As the lever 226 is moved counter-clockwise, the length of the stays is increased to a maximum at the left-hand end of slot 223a. When long stays are being applied, the lever 226 will be over at the left-hand side, FIG. 14; thus, there is a greater travel for the overrunning clutch 215 and thus the spring 220 will be compressed very slightly. When stay strips of short length are being applied as on shallow boxes, the overrunning clutch 215 only makes a short stroke and thus the spring 220 will be compressed a substantial amount. The stay strips are driven by the compression on the spring 220 in FIGS. 13 and 14 and thus even for the maximum length of stay strips, there is preloading of the spring 220 which is adequate to drive the stay strips and also provide overload protection in the case of a jam in the stay stand. With the unitized construction, the feed to all four of the stay stands is adjusted concurrently by the lever 226 and such adjustment may be made while the machine is running.

Cross head assembly

In FIG. 15 there is shown a cross head assembly which provides the support for the center plunger 32 and the form 31. At one end of the cross head 33 there is provided a bearing block 230 which is adapted to be received in an oversize slot 33a in cross head 33. The length of the slot 33a along the cross head 33 is greater than the corresponding dimension of the bearing member 230 is provided with an outwardly extend-to move lengthwise of the cross head 33 and compensates for any misalignment in the shafts 34, 35 which support the cross head 33. The upper end of the bearing member 240 is provided with an outwardly extending flange 230a and the bottom of the bearing 230 is provided with a similar flange 230b. The bearing 230 is retained in the slot 33a of the crosshead 33 by reason of the shaft 34 which passes therethrough and the flanges 230a, 230b.

Discharge conveyor

Figure 16:
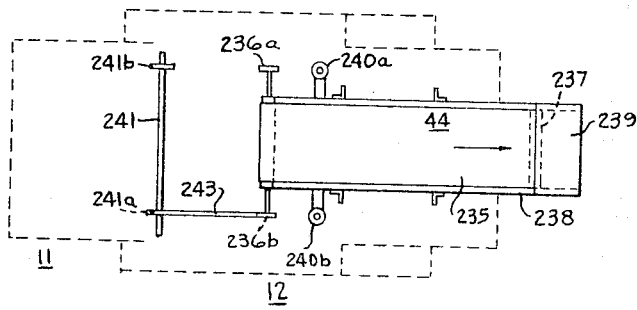
FIGS. 16, 16a and 16b are plan views of the quick change three directional discharge conveyor.
Figures 16A, 16B:
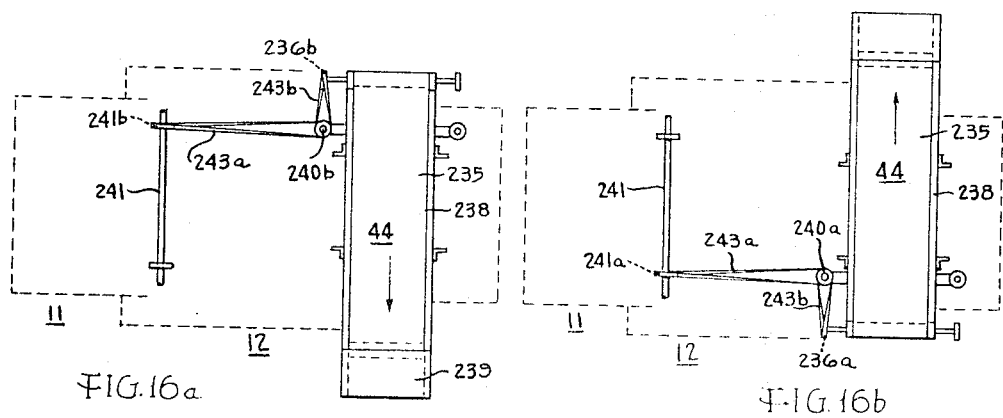

Referring to FIGS. 16, 16a, 16b, and 17, there is illustrated an arrangement for supporting the discharge conveyor 44 to provide quick change of discharge direction. The discharge conveyor 44 is positioned at the rear of the machine 12 and may extend in any of three different directions, FIGS. 16, 16a, 16b, for discharging the completed setup boxes. The discharge conveyor 44 comprises an endless belt 235 which extends over a pair of end rollers 236 and 237 which are supported for rotation at the ends of the frame 238 of the conveyor 44. The ends of the roller 236 are provided with pulleys 236a, 236b, respectively. The discharge end of frame 238 supports a discharge platform 239. Intermediate the ends of the conveyor 44 is a plate 240 which is secured to the frame 238 of the conveyor. The plate 240 supports at its opposite ends a pair of double pulleys 240a and 240b which are carried on vertical bearings. The drive for the conveyor 44 is from a countershaft 241 driven from the motor which drives the main cam shaft M of the staying machine 12. When the conveyor 44 is discharging from the end of the machine FIG. 16, the pulley 241a on countershaft 241 is used in combination with the pulley 236b and the belt 243 associated with pulley 241a has the correct length. When the machine is discharging from the right side, FIG. 16a, the other pulley 241b on countershaft 241 is used along with the right angle belt arrangement comprising belts 243a and 243b. In FIG. 16b the conveyor 44 is illustrated to discharge from the left-hand side of the staying machine 12.

Figure 17:
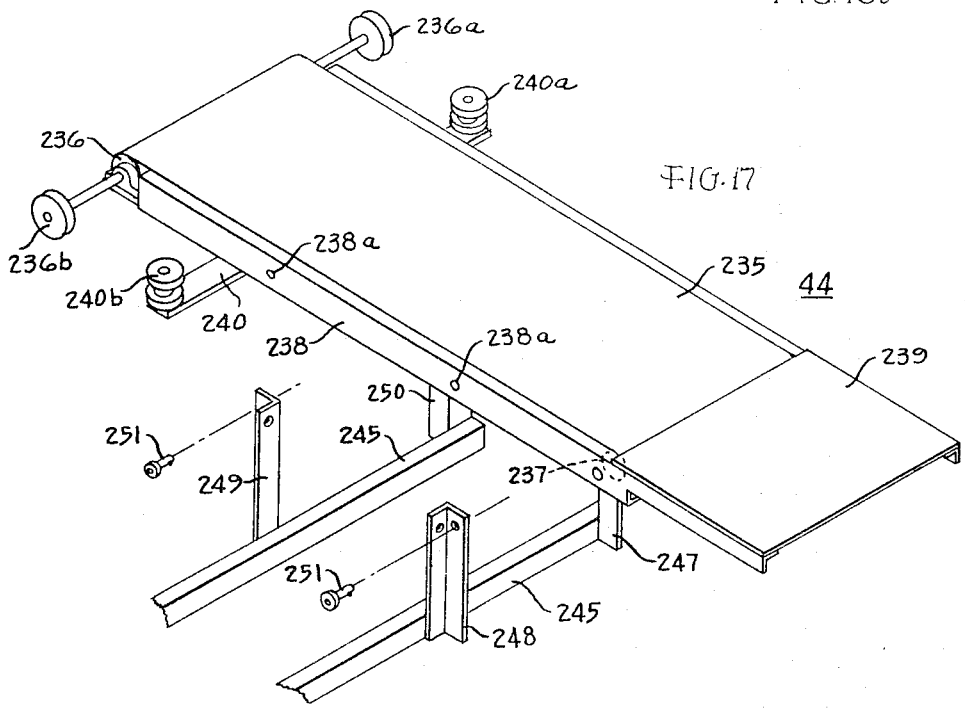
FIG. 17 is an exploded perspective of the discharge conveyor.

The conveyor 44 is supported on a pair of extensions 245, FIGS. 4 and 17, which are carried at their rear ends by a shelf 47b which forms part of the base frame 47 of the staying machine. The extensions 245, FIG. 17, have supported thereon four vertical right-angle members 247–250. The spacings between adjacent angle members 247–250 are equal and equal to the width of conveyor frame 238 so as to receive the conveyor frame 238 between the pairs of angle members in any of the three different positions, FIGS. 16, 16a and 16b. The sides of frame 238 of the conveyor are provided with four holes 238a to receive easily removable pins 251. The pins are adapted to extend through correspondingly spaced holes in the right-angle members 247–250 and into holes 238a of frame 238 and thus lock the conveyor frame 238 to the frame of the staying machine 12 in fixed position. This positions the conveyor 44 correctly with regard to the position selected for discharge of the boxes from the staying machine. As shown in FIGS. 16, 16a and 16b, the conveyor may be positioned to discharge boxes from the end of the machine or from either side of the machine. It is to be noted that the same holes 238a in the sides of frame 238 of the conveyor are used for each position and this automatically places the conveyor in the correct position for discharging the boxes from any of the three sides of the machine. It is to be understood that plate 240 and roller 236 may be provided with pulleys at only one end if desired and these pulleys changed to the opposite ends when required by the selected position of the conveyor 44.

Crimping mechanism

Referring to FIGS. 1 and 18, there is illustrated the crimping system for crimping the box sides. The crimping action consists of over bending the sides of the sides of the box toward the center and this squares the sides with the bottom and corrects the tendency of the sides to spring out at the top. During the crimping cycle, the box sides are pushed in and the amount varies from one setup to another. On prior machines, it was necessary to set each crimping cycle individually by a trial and error method which involved starting and stopping the machine until the correct amount of crimping action was obtained on each side of the box. The present unitized crimping system enables the amount of crimping for all four walls of the box to be varied concurrently by a simple adjustment and such adjustment may be made while the machine is running.

As may be seen in FIG. 18, there is provided a pair of side crimping assemblies 256 and a pair of end crimping assemblies 257. The side crimping assemblies 256 are carried by the tables TR and TL while the two end crimping assemblies are carried by crimping support bars 258 which move lengthwise of the machine when the corner blocks $C_1$–$C_4$ are adjusted lengthwise of the machine. This arrangement is best shown in FIG. 1.

As may be seen in FIG. 18, the side crimping assemblies 256 each includes a pair of crimper blades 260 and a wedge 261 which are carried by a vertically adjustable slide 262. The slide 262 has a block 262a at the bottom and a pin, not shown, extends down from wedge 261, through blades 260 and into a hole in block 262a for ready attachment or detachment of the wedge and blades to the crimper assemblies. The slide 262 is carried by a slotted upright 263 which, in turn, is carried by a body slide 264 which is adapted to reciprocate in a bearing block 265, the latter being carried by the table.

Crimper blades 260 and wedge 261 are adjustable vertically to accommodate boxes of different depths by means of a spring-biased knob 266 which extends through the vertical slot in the upright 263 and is carried by the slide channel 262. As best seen in FIG. 22, a scale 262b, calibrated for depth of box, and an indicator mark 263a on relatively movable parts 263 and 262 cooperate to show the correct height for the crimper assemblies. The spring-loaded knob 266 is provided with a serrated face to engage the serrated surface 263b on member 263. The knob 266 will lock and unlock the crimper height slide 262 with only a quarter turn. This arrangement makes it possible to quickly set the crimper blades at the correct height for any depth of box without turning the machine over to lower the form during setup.

The end crimping assemblies 257 are generally similar to the side crimping assemblies 256. In FIG. 18, the upper portions of the end crimping assemblies 257 have been cut away for clarity and are illustrated as including a single crimper blade 268 which is adjustably carried by a vertical slide 269 which, in turn, is carried by a slotted upright 267 and a slide member 270 adapted to reciprocate in a bearing block 271.

In FIG. 18 the drive for the crimping assemblies 256 and 257 is derived from a single cam lever 274 having at one end thereof a cam follower 275 that contacts the main eccentric drive shaft M of the machine. The lever arm 274 is mounted on an adjustable pivot 276 which moves the pivot point toward or away from the eccentric shaft M thereby increasing or decreasing the operating stroke. The pivot 276 is carried by a pair of lead screws 277, 278 which are supported from the frame of the machine. The lead screws 277, 278 are interconnected by a chain 279 passing over a pair of sprockets 280 respectively carried by the lead screws 277, 278. The lead screw 278 is provided with an extension to which is connected, by a flexible connection 282, a hand crank 283. It is to be understood that the hand crank may be replaced by other drive means such, for example, as a gear motor. The motion from the lever arm 274 is transmitted to the crimping drive shaft 285 by means of a connecting link 286 and arm 287. The return motion is provided by a spring 288 which is connected between link 286 and the frame of the machine.

The arm 287 is fixed to the drive shaft 285 as are the arms 289. The upper ends of the arms 289 are connected to a crossbar 290 by links 291 which extend through guide members 292. The crossbar 290 is engaged by a pair of clamp blocks 294, FIG. 20, which are connected to a pair of pull rods 295. One end of rods 295 slides in guides 295a carried by the tables. The opposite ends of the pull rods 295, FIG. 18, are connected to arms 296 which, in turn, are connected to vertical connecting shafts 297. The upper ends of the vertical connecting shafts 297 are connected to arms 298 which, in turn, are connected to links 299. The links 299 connect to the body slides 264. From the foregoing, it will be seen that the longitudinal reciprocating motion of the crossbar 290 is converted into transverse reciprocating motion of the side crimping assemblies 256. The tension springs 296a connected to arms 296 provide a bias force tending to return the side crimpers 256 to their outer position after crimping a box.

The motion from the main eccentric shaft M and cooperating arm 274 is transmitted to the two end crimping assemblies 257 in much the same manner. A single arm 300 carried by the drive shaft 285 is connected by a link 301, FIG. 19, to a pair of bell cranks 303 which are connected at their lower arms by a link 304. The bell cranks 303 are pivoted on supports 302 secured to the inside of the frame of the machine. The upper arms of the bell cranks 303 drive a crossbar 305 which engages clamp blocks 306 which are connected to one end of the pull rods 307. The opposite ends of pull rods 307, FIG. 18, are connected to arms 308 which are carried by vertical shafts 309. The upper ends of the shafts 309 are connected to arms 310 which, in turn, are connected to links 311 attached to the slide members 270 of crimping assemblies 257. The tension springs 270a bias the slides 270 to their outer position to return the end crimpers 257 to their outer position after crimping a box.

As may be seen in FIG. 19, the clamp blocks 306 are substantially U-shaped and are free to slide lengthwise of the crossbar 305. This permits the clamp blocks 306 to slide on the crossbar 305 when the end crimping assemblies 257 are adjusted along with the corner blocks for boxes of different lengths. The clamp blocks 294 are of similar construction and are adapted to slide lengthwise of the crossbar 290, FIG. 20, when the side crimping assemblies 256, FIGS. 1 and 18, are adjusted for boxes of different widths.

The crimper drive system is preset at the factory and requires no further adjustment for normal operation other than turning the unitized adjustment handle 283 to obtain the desired amount of box crimp with the machine stopped or in operation. However, provision has also been made for individual adjustment of each crimper device 256, 256 and 257, 257 to provide compensation for unusual box sizes, blank materials, score line depths and other variations. Each crimper is provided with a two-position quick change operating stroke adjustment incorporated in the drive linkages as by providing the upper lever arms 298 and 310 in each of the crimpers 256 and 257 with second holes 298a, 310a for connection to the pins on connecting links 299 and 311, FIG. 18.

Takeout assemblies

The side crimping assemblies 256, FIG. 18, are also adapted to be provided with takeout assemblies for moving a stayed box downwardly out of the staying zone and onto the belt of the discharge conveyor 44, FIG. 4, before a succeeding box is delivered to that position by the plunger form. With relatively deep boxes, the weight of the box itself will usually be adequate to cause the completed stayed box to drop by gravity from the staying and crimping zone onto the discharge conveyor. However, when shallow boxes are being stayed, the weight of the box frequently is too small to permit it to be removed from the staying zone of the machine by gravity alone. Accordingly, the present machine includes provision for automatically ejecting the box. This is accomplished by takeout devices now to be described. The takeout devices place the boxes uniformly on the discharge conveyor and prevent jams. The box takeout is accomplished after the crimping cycle and before the next box enters the sealing or staying zone.

As shown in FIGS. 21-23, the takeout devices include a pair of takeout arms 312 in the form of wires having bent ends 312a, FIG. 21, which are adapted to engage the top edges of the side walls of the box and move it downwardly onto the belt of the discharge conveyor. The takeout devices are mounted for pivotal movement on the same supports as the side crimper assemblies 256 and are actuated during the return stroke of the crimpers.

The takeout arms 312 are carried by collars 313 which are secured to pivotal shaft 314 by set screws 315. The shaft 314 is carried by the spaced bearing supports 316. The upper ends of the bearing supports 316 are provided with bearing bushings and the lower ends of the supports 316 are each provided with a countersunk opening communicating with an open ended slot 316a to receive a spring biased lock pin 317, FIG. 22. The lock pin 317 is carried within the bearing block 265 and its outer conical end 317a is adapted to extend through a hole in the takeout mounting block 318 which is secured to the side of the crimper bearing block 265 by screws 319, FIG. 21. Thus, it will be seen that by compressing the locking pins 317, FIG. 22, so that the conical portions 317a are moved inwardly out of the engagement with the corresponding conical surfaces in the lower ends of the bearing supports 316, this will bring the small diameter cylindrical portions 317b of the pins 317 into alignment with the open ends in the slots 316a and thus permit the bearing supports 316 to be withdrawn from the mounting blocks 318. This construction provides for easy removal of the takeout devices from the crimping assemblies.

As may be seen in FIG. 22, the shaft 314 supports a takeout actuator 321 between the bearing supports 316. The actuator 321 is split at one side and is clamped to the shaft 314 by a clamping screw 322, FIG. 23. The opposite ends of the actuator 321 provide recessed housings for spiral springs 323, FIG. 21. The opposite ends of the springs 323 are pinned respectively to the actuator by pins 324 and to the spaced bearing supports 316 by pins 325, FIG. 22. The actuator 321 supports an actuating link 326 on a horizontal pivot 327. The free end of the actuating link 326 is provided with a pair of cam surfaces 326a and 326b which are adapted to engage surfaces 328a and 328b on an actuator block 328, FIGS. 21 and 23. The takeout actuator block 328 is carrier by the body slide 264 and may be integral therewith.

In FIG. 21, the takeout devices are illustrated with the takeout arm 312 in the "up" or inactive position. The arms 312 are provided with plastic sleeves 330 in the area where they engage the stay shafts 213, 214 due to the bias force of the spiral springs 323. The free end of the actuating link 326 rests on the upper surface 328b of the actuator block 328 under the influence of gravity. As the crimper blades are moved inwardly by the body slide 264, the actuator block 328 moves with it. As the notch 328a moves to the right, FIG. 21, the cam surface 326a will move off of the surface 328b and engage the notch 328a. The members 326 and 328 will act similar to a pawl and ratchet arrangement and on the return stroke of the crimper devices the body slide 264 will move to the left causing the takeout shaft 314 to rotate in a clockwise direction due to engagement between the actuating link or pawl member 326 and the actuator block or ratchet member 328. This rotation is against the bias of the spiral springs 323 and continues until the takeout arms 312 are moved to the lower position as shown in FIG. 23. At this time the cam surface 326b on pawl member 326 will engage the upper surface 328b on the actuator block 328 causing the shoulder 326a to be raised up out of engagement with the notch 328a, FIG. 23. At this time, the takeout arm 312 will return to the upper position as shown in FIG. 21 while the actuator block 328 continues to move to the left until it reaches the position shown in FIG. 21.

From the foregoing, it will be seen that the drive for the takeouts incorporates a modified pawl and ratchet arrangement mounted on the top of each of the side crimpers 256 and that the takeout arms 312 are driven down by the side crimper return motion. The takeout arms 312 are returned to their up positions due to the loading provided by spiral springs 323. It is to be noted that the takeout arms can be operated with any amount of crimp or with no crimp at all as when the crimper blades are removed.

Coding system

As mentioned above, the staying machine is adapted to stay boxes of wide variety of sizes. For example, in one application the staying machine was capable of staying boxes having lengths varying from 3" to 23", widths varying from 1⅜" to 15⅝" and depths varying from ⅜" to 5". With such variations in sizes, it will be understood it is desirable to use crimper blades, takeouts and folding rolls of different lengths to accommodate the variety of box sizes. While the crimper blades, takeouts and folding rolls are of different sizes, nevertheless, they are interchangeable with regard to other supporting structures in the machine. In order to assist the operator in determining the proper size of crimper blades, takeouts and folding rolls to be inserted in the machine, there is employed a method of coding these interchangeable parts that engage the walls of the blank or box in accordance with the different sizes of boxes to be formed. The coding may comprise a series of colors or it may be in other forms of indicia such as numerals, letters or other types of markings. The code markings may also be of sufficient width so as to cover a range of box sizes.

As may be seen in FIG. 1, there is provided on the end of frame 46 extending transversely of the machine, a code in the form of a scale 401 having calibrated markings thereon corresponding to different box widths. It will be recalled that in adjusting the machine for boxes of different widths the tables TR and TL, which respectively support the pairs of corner blocks $C_1$, $C_2$ and $C_3$, $C_4$, are moved relative to each other by means of the hand wheel 76. One of the tables such as table TL is provided with indicating means 402 illustrated here as the edge of table TL which is adapted to cooperate with the scale 401 to indicate thereon the width of the box to be formed for that particular adjustment of the machine. On the side of the machine frame there is illustrated in FIG. 1 a cover 405 which carries a code in the form of a calibrated scale 406 similar to scale 401. The adjustable support 157 for the corner block $C_4$ is provided with an indicator in the form of a pointer 407 which cooperates with scale 406 in the same manner as indicator 402 cooperates with scale 401. Thus, when hand wheel 155 is rotated to move the pair of corner blocks $C_1$ and $C_4$ relative to the other pair of corner blocks $C_2$ and $C_3$ for adjusting the machine to accommodate boxes of different lengths, the pointer 407 will likewise be adjusted along the scale 406. The different sizes of crimper blades 260 and takeouts 312 that are carried by the side crimping assemblies 256 are coded in the same manner as the scale 406. For example, if the scale 406 comprises a series of different colors corresponding to different sizes of boxes, then the interchangeable crimper blades and takeouts are coded with the same colors for the corresponding sizes. Similarly, the end crimper blades 268 and end folding rolls 408 associated with the ends of the box are provided with the same coding as on the scale 401.

When the operator adjusts the hand wheels 76 and 155 to move the corner blocks $C_1$–$C_4$ so that the setup gauges, 144a–144d, FIG. 8, engage the corners of the form 31, he will note the position of the indicators 402 and 407 with respect to their corresponding coded scales 401 and 406. He will then install crimper blades, folding rolls and takeouts as required by the coding on these scales. This enables the operator to determine immediately the correct size of interchangeable parts to be inserted in the machine. As described above, each of the interchangeable parts is provided with quick connection means so that the parts may be rapidly changed and without the need of any tools. The end folding rolls 408, FIG. 8, are of spring-loaded telescopic construction and thus are readily removed or inserted in the supporting holes in the end folders 149.

Changeover operation

Having described the various parts of the box forming and staying system in detail, there will now be described the procedure to be followed in changing the system to produce a different size of setup box. The new form 31 to be run is selected and bolts and washers 31a are installed for supporting the form in the form foot 32b on center plunger 32. The depth of the box is measured and this depth is marked on the form for setting the center plunger height. The correct length of crimper blades is selected. As a general rule, the crimper blades will be at least three inches shorter than the length and one and one-half inches shorter than the width of the form. A supply of box blanks of the new size is made ready for loading on tray 50 and one blank and a piece of stay are prepared for setting the gate opening in the gate assembly 13. The preparatory steps described above can be taken while the machine is running.

To adjust the machine, the motor 9 is turned off with the form 31 in the up position and the clutch latched out. The blanks B are removed from the feeder assembly 11 and the proper stay length is selected by moving lever 226 along the calibrated arc. The nylon bumper 190 at the $C_3$ corner block location is pivoted up out of engagement with the stop member 191 on the pressure rod 164 so that the corner plungers 162 for corner blocks $C_3$ and $C_4$ may be moved to their rear positions against the corner block stops 181 and 186. The left side guide 28 for the blank is adjusted for the desired depth of box using the scale 198, FIG. 12, the latter having been omitted in FIG. 1 for clarity. The corner block bolts $b_3$ and $b_4$ and pressure clamp bolts 177 are loosened starting with the number 3 corner, then proceeding to the number 4 corner. Proceeding around the machine 12 the two main table bolts $b_t$ at the back of the machine are loosened next followed by loosening the corner block bolts $b_1$ and $b_2$ and pressure clamp bolts 177 on the number 1 and number 2 corners. Next, the nylon bumper 190 at the number 2 corner is flipped up so that the corner plungers 162 may move back against the corner plunger stops 181 and 186 at the number 2 and number 1 corners. The old form 31 is removed along with folding rolls, crimping blades, takeouts and crimpers if necessary. If the new form size is larger in length or width than the preceding form size, the machine is opened to clear the new form size by rotating the hand wheels 76 and 155 accordingly. The new form 31 is installed loosely on the center plunger foot 32b by rotating the form 31 so that the bolts 31a enter the grooves 32a on the form foot 32b, FIG. 8.

With the new form installed loosely on the center plunger foot, the setup gauges 144a–144d are rotated from the phantom line position shown in FIG. 8 for gauge 144a to the solid line position, the latter being the gauging position. The corner blocks $C_1$–$C_4$ and tables TL, TR are adjusted by the hand wheels 76 and 155 until the setup gauges 144a–144d contact the corners of the form 31 as in FIG. 8. This will automatically center the form 31 on the foot 32b and the form bolts 31a may now be tightened. The height of the form 31 is set by rotating the adjusting knob 150 on top of the crosshead 33 until the mark on the form indicating the depth of box to be run is in line with the top of the setup gauges 144a–144d. The setup gauges 144a–144d are then rotated out of engagement with the form 31 to their inactive position as indicated by the phantom line position for setup gauge 144a, FIG. 8.

The corner block bolt $b_2$ is tightened and the corner plunger 162 is corner block $C_2$ and its pressure spring cartridge 171 are moved to back position with the link 182 against the stop 181. The spring cartridge 171 is then locked to the rod 164 by tightening the clamping screw 177, FIG. 1. These operations are repeated at the number 1 corner moving the link 166 back against the corner stop 186 and locking the associated spring cartridge 171 to the rod 164 by tightening clamping bolt 177. The table bolts $b_t$, $b_t$ are tightened to lock the tables TR, TL in position. The foregoing locking operations performed at the number 1 and number 2 corners are repeated at the number 4 and number 3 corner block locations. Thus, all of the corner blocks $C_1$–$C_4$ are locked in their new positions and the spring cartridges 171 are secured to the rods 164 with the corner plungers 162 in their rear positions.

Next, the crimping blades are selected and installed for the new size and adjusted for height in the manner previously described in connection with FIG. 22. The crimping blades, folding rolls and takeouts are selected in accordance with the indication on coded scales 401 and 406. The feeder side guides 65 are opened by hand wheel 71 to clear the new blanks. The gate opening in the gate assembly 13 between the top gate member 98 and the bottom gate member 99, FIG. 3, is adjusted by the eccentric knob 103 until gate opening has a width sufficient to pass only one blank at a time, i.e., corresponding to one blank and one piece of stay. The upper gate member 98 is then locked in position by means of lock screw 104, FIG. 3. The new blanks are placed on a tray and the feeder is loaded by inserting the tray 50 into the links on spaced chains 51, FIGS. 1 and 3. The stack heighth is raised until the green light comes on, as previously described in connection with FIG. 5, thus indicating that the top blank in the stack is in alignment with the opening in the gate. The starting tip assembly 14 is adjusted to the new size blank and reversed if necessary to accommodate the new size. The starting tip is set to the back end of the blanks using the gauge in the manner previously described in connection with FIG. 6a. The starting tip is locked in place and the gauge removed. The side guides 65 are adjusted by hand wheel 71 to bring them into engagement with the sides of the stack of blanks B. The guides 72 for the forward ends of the stack of blanks B were previously adjusted concurrently with adjustment of the tables TR and TL from which the guides 72 are positioned. The machine is then ready to be started and make boxes. The amount of crimp may be adjusted by rotating handle 283 and as previously mentioned this may be done while the machine is running.

From the foregoing it will be seen that the crimpers may be adjusted from a single station and by coding the interchangeable parts such as the crimper blades, etc., these parts may be quickly and easily removed and replaced by the operator. While there has been described a preferred embodiment of the invention, it will be understood that further modifications may be made without departing from the spirit and scope of the invention as set forth in the appended claims.

What is claimed is:

1. A box forming machine comprising a frame, means on said frame for forming boxes, opposed reciprocating box end and side crimpers mounted on said frame at said box forming means, a crimper reciprocating cam rotatable in said frame, a pivotally mounted cam follower, means connected between said cam follower and said crimpers for reciprocating the crimpers, and adjustable means supported by said frame and mounting said cam follower for shifting the position of the cam follower pivot relative to said cam to adjust the strokes of said crimpers while the machine is running.

2. In a system for forming and staying boxes, the improvement of a crimping system for crimping the box sides to square the sides with the bottom and correct the tendency of the sides to spring out at the top comprising a pair of side crimpers, a pair of end crimpers, drive means for reciprocating said crimpers through a preselected operating stroke relative to the box sides, and means for concurrently adjusting the stroke of said crimpers while said system is in operation.

3. In a system for forming and staying boxes, the improvement of a crimping system for crimping the box sides to square the sides with the bottom and correct the tendency of the sides to spring out at the top comprising a pair of side crimpers, a pair of end crimpers, drive means for reciprocating said crimpers through a preselected operating stroke relative to the box sides, means for concurrently adjusting the stroke of said crimpers, and means for individually adjusting the stroke of each of said crimpers.

4. In a system for forming and staying boxes, the improvement of a crimping system for crimping the box sides to square the sides with the bottom and correct the tendency of the sides to spring out at the top comprising a pair of side crimpers, a pair of end crimpers, drive means for reciprocating said crimpers through a preselected operating stroke relative to the box sides, comprising a pivoted lever and drive linkage connecting said lever to the crimpers and means for concurrently adjusting the position of the pivots of said levers for concurrently adjusting the stroke of said crimpers.

5. A box forming machine comprising a frame, a reciprocating form, normally stationary spaced side and end box folders cooperating with said form, opposed reciprocating box side and end crimpers mounted between said folders for advancing against a box within the folders, a box takeout finger mounted for vertical motion at each of a pair of opposed crimpers, means operable upon retraction of the crimpers and after the form has been raised from the box for lowering the takeouts to eject a box from within said folders, and means operable upon advance of their crimpers for raising the takeouts.

6. The machine of claim 5, wherein each takeout comprises an arm mounted on a shaft with the shaft being pivoted in normally stationary block means, spring means for biasing the arm to its raised position, pawl means on said shaft, and ratchet means movable with the crimper, said pawl and ratchet means being engaged during the retract stroke of the crimper to lower said arm for ejecting the box.

7. In a machine for forming and staying boxes, the improvement of a crimping system for crimping the box sides to square the sides with the bottom and correct the tendency of the sides to spring out at the top, comprising a pair of side crimpers, a pair of end crimpers, drive means for reciprocating said crimpers through a predetermined operating stroke relative to the box sides, and means for concurrently adjusting the stroke of said crimpers; each of said crimpers comprising a vertically adjustable slide member for supporting a crimper blade, a stationary member supporting said slide member, a scale calibrated for depth of box associated with one of said members, indicating means carried by the other of said members and cooperating with said scale, and means for locking and unlocking said slide member with respect to said stationary member to quickly set the crimper blade at the correct height corresponding to the desired depth of box.

8. The machine of claim 7, wherein said slide member locking and unlocking means comprises cooperating spring-loaded, serrated members.

References Cited by the Examiner

UNITED STATES PATENTS

| | | | |
|---|---|---|---|
| 1,383,697 | 7/1921 | Davis | 93—41 |
| 2,701,017 | 2/1955 | Wiedemann | 83—522 X |
| 2,921,506 | 1/1960 | Johnson | 93—51 |
| 2,958,133 | 11/1960 | Seitz. | |
| 2,982,188 | 5/1961 | Von Hofe et al. | 93—41 |

BERNARD STICKNEY, *Primary Examiner.*